US012645812B2

(12) United States Patent
Arngren et al.

(10) Patent No.: US 12,645,812 B2
(45) Date of Patent: Jun. 2, 2026

(54) METHOD, COMMUNICATION DEVICES AND A SERVER FOR CONTROLLING CONTENT

(71) Applicant: Telefonaktiebolaget LM Ericsson (publ), Stockholm (SE)

(72) Inventors: Tommy Arngren, Södra Sunderbyn (SE); Bernard Smeets, Dalby (SE); Peter Ökvist, Luleå (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 160 days.

(21) Appl. No.: 18/282,003

(22) PCT Filed: Mar. 16, 2021

(86) PCT No.: PCT/EP2021/056659
§ 371 (c)(1),
(2) Date: Sep. 14, 2023

(87) PCT Pub. No.: WO2022/194353
PCT Pub. Date: Sep. 22, 2022

(65) Prior Publication Data
US 2024/0152634 A1 May 9, 2024

(51) Int. Cl.
*G06F 21/60* (2013.01)
*G06F 21/00* (2013.01)
*H04L 9/40* (2022.01)

(52) U.S. Cl.
CPC ........ *G06F 21/606* (2013.01); *H04L 63/0876* (2013.01)

(58) Field of Classification Search
CPC ........ G06F 21/606; G06F 21/32; G06F 21/12; G06F 21/60; G06F 21/604; G06F 21/62; G06F 21/629; H04L 63/0876
See application file for complete search history.

(56) References Cited

U.S. PATENT DOCUMENTS

2015/0254467 A1* 9/2015 Leuthardt ............. G06F 21/606
726/28
2017/0099300 A1 4/2017 Rlittmaster et al.
(Continued)

FOREIGN PATENT DOCUMENTS

EP 2 963 607 A1 1/2016

OTHER PUBLICATIONS

International Search Report and Written Opinion issued in International Application No. PCT/EP2021/056659 Dec. 14, 2021 (13 pages).

*Primary Examiner* — Edward Zee
(74) *Attorney, Agent, or Firm* — Rothwell, Figg, Ernst & Manbeck, P.C.

(57) ABSTRACT

A method at a first communication device for providing a second communication device access to content, the method comprising: providing an offer to the second communication device, offering the second communication device conditional access to the content, wherein access to the content at the second communication device is adaptable based on sensor data of at least one of the first and the second communication device; acquiring sensor data of at least one of the first and the second communication device; providing the second communication device full access to the content in case it is that the sensor data of at least one of the first and the second communication device indicates that the second communication device shall be grated full access to the content, or determining that access to the content is to be restricted at the second communication device, and providing the second communication device restricted access to the content, in case it is determined that sensor data of at least one of the first and the second communication device is indicating that access to the content is to be restricted at the second communication device.

21 Claims, 17 Drawing Sheets

(56)          References Cited

U.S. PATENT DOCUMENTS

2020/0167443 A1      5/2020  Piccionelli et al.
2021/0385183 A1 *  12/2021  Henao Mota ....... H04L 63/0838

* cited by examiner

100

METHOD, COMMUNICATION DEVICES AND A SERVER FOR CONTROLLING CONTENT

CROSS REFERENCE TO RELATED APPLICATIONS

This application is a 35 U.S.C. § 371 National Stage of International Patent Application No. PCT/EP2021/056659, filed 2021 Mar. 16.

TECHNICAL FIELD

A method for providing content from a first to a second communication device in a controlled manner and communication devices and a server, capable of executing the suggested method.

BACKGROUND

With today's extensive use of communication devices, exchange of various types of data content, which could include any type of data content from relatively simple digital data content, such as e.g. documents and still pictures, to videos, have become common practice. Messaging services, such as e.g. Instant Messaging (IM) or Short Message Services (SMS), allows a user to send messages and content from one transmitting communication device to one or several receiving communication devices, where the devices could be any type of wireless communication devices, such as e.g. laptops, pads or smart phones, or fixed communication devices, such as e.g. computers.

The transmitted content is typically out of control of the sender as soon as "send" has been invoked at the transmitting entity. The sender of IMs and similar can typically also not revoke any transmitted information. There is however limited revocation functionality available in e.g. MS Outlook where a user can prohibit a message to be read at a receiving entity, at least if the recipient has not yet marked the received massage as "read".

There are services such as e.g. SnapChat, Instagram and Facebook, which allow users to share or post content that is visible for a certain time at the receiver side, where after a certain time has elapsed, the shared content is to be removed, or at least not visible, from the receiving service.

However, apart from the mentioned, predetermined conditional content sharing option, a sender will not be able to have any impact on the sharing of the content, but mainly has to trust that the service actually removes the information according to agreed terms of use.

It is also known to allow a remote communication device, and implicitly also a remote user, to access another communication device, where the devices may be e.g. two computers e.g. for the purpose of support and maintenance. With such remote support, a technician may connect from one communication device to another from anywhere in the world. Once connected, the technician can take control of the other device and perform whatever task is needed remotely. Once under control, the technician can e.g. install updates, perform troubleshooting issues, and even provide on-demand support from one communication device to the other.

It is also known to make use of encryption to allow a sender to send a message or content to a receiver that is authorized to receive and de-crypt the transmitted content. The sender will however not have any control of the content or information after the receiver has de-crypted the data.

Another aspect of instant communication channel access is push-to-talk type of communications where one user at a time is talking while their respective push-tom talk button is pressed. As soon as the button is released the communication channel is available for another person in the communication group to activate the button and talk.

SUMMARY

It is an object of the present document to address, or at least alleviate, at least some of the problems described above.

According to one aspect, a method at a first communication device for providing a second communication device access to content is suggested. The suggested method comprises that an offer, offering a second communication device access to the content, is provided to the second communication device, wherein access to the content at the second communication device is adaptable based on sensor data of at least one of the first and the second communication device. Sensor data of at least one of the first and the second communication device is acquired and the second communication device is provided full access to the content, in case it is determined that the sensor data of at least one of the first and the second communication device indicates that the second communication device shall be granted full access to the content, or it is determined that access to the content is to be restricted at the second communication device, and the second communication device is provided restricted access to the content, in case it is determined that sensor data of at least one of the first and the second communication device is indicating that access to the content is to be restricted at the second communication device.

According to another aspect, a method executable at a second communication device, for accessing content, provided by a first communication device, is suggested. The method comprises receiving the content, wherein access to the content is conditional, based on sensor data of at least one of the first and the second communication device and acquiring sensor data of at least one of the first and the second communication device. The method also comprise acquiring full access to the content in case it is determined, at the second communication device, that the sensor data of at least one of the first and the second communication device indicates that the second communication device shall have full access to the content, or acquiring restricted access to the content, in response to recognizing that sensor data of at least one of the first and the second communication device indicates that access to the content is to be restricted at the second communication device.

According to yet another aspect, a method at a server for providing a second communication device access to content, provided by a first communication device, is suggested. The method comprises providing an offer to the second communication device, offering access to the content, wherein access to the content at the second communication device is conditional based on sensor data of at least one of the first and the second communication device and providing the second communication device full access to the content, in case it is determined that the sensor data of at least one of the first and the second communication device indicates that the second communication device shall have full access to the content, or providing the second communication device restricted access to the content, in response to recognizing an indication to restrict access to the content at the second communication device, based on the sensor data of at least one of the first and the second communication device.

According to another aspect a first communication device for providing a second communication device access to content is suggested, where the first communication device comprise processing circuitry and a memory, comprising executable instructions, which when executed by the processing circuitry, causes the first communication device to provide an offer to the second communication device, offering the second communication device conditional access to the content, wherein access to the content is conditional based on sensor data of at least one of the first and the second communication device. The first communication device is also caused to acquire sensor data of at least one of the first and the second communication device and to provide the second communication device full access to the content, in case it is determined that the sensor data of at least one of the first and the second communication device indicates that the second communication device shall be granted full access to the content, or determine that access to the content is to be restricted at the second communication device, and provide the second communication device restricted access to the content, in case it is determined that sensor data of at least one of the first and the second communication device is indicating that access to the content is to be restricted at the second communication device.

According to another aspect a second communication device for accessing content, provided by a first communication device is suggested, where the second communication device comprise processing circuitry and a memory, comprising executable instructions, which when executed by the processing circuitry, causes the second communication device to receive the content, wherein access to the content is conditional, based on sensor data of at least one of the first and the second communication device and to acquire sensor data of at least one of the first and the second communication device. The second communication device is also caused to acquire full access to the content, in case it is determined, at the second communication device, that the sensor data of at least one of the first and the second communication device indicates that the second communication device shall have full access to the content, or acquire restricted access to the content, in response to recognizing that sensor data of at least one of the first and the second communication device indicates that the second communication device shall have restricted access to the content.

According to yet another embodiment, a server for providing a second communication device access to content, provided by a first communication device is suggested, where the server comprise processing circuitry and a memory, comprising executable instructions, which when executed by the processing circuitry, causes the second communication device to provide an offer to the second communication device, offering the second communication device access to the content, wherein access to the content at the second communication device is conditional based on sensor data of at least one of the first and the second communication device. The server is also caused to provide the second communication device full access to the content, in case it is determined that the sensor data of at least one of the first and the second communication device indicates that the second communication device shall have full access to the content, or providing the second communication device restricted access to the content, in response to recognizing an indication to restrict access to the content at the second communication device, based on the sensor data of at least one of the first and the second communication device.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

In order to address at least some of the issues mentioned above, a method is suggested, where a first user, wanting to offer or provide content to another user under certain conditions or restrictions, will be able to do so in a controlling manner, based on sensor data of one or both communication devices of the two users. Such a process may also be referred to as a process for sharing content between the two communication devices in a controlled manner.

The suggested method can be applied in a device-to-device communication approach, i.e. during a direct communication between the two devices, or with the assistance of a server, where the server can be more or less involved in how the content is provided and how access to the content can be restricted at the receiving device.

By restricting access to content a user may choose to either allow access or no access to the content, or the amount of access to certain content may vary depending on interpretation of captured sensor data, such that e.g. various security steps executed between the two communication devices may result in the second communication device being considered to hold a certain level of trust or security level, which allows for a certain level of access to the respective content. Consequently, access to content of a specific format, or provided when applying certain filters, may be provided or denied, depending on captured sensor data.

In addition to the method mentioned above, a communication device, capable of conditionally offering content to another communication device, a communication device, capable of receiving offered content, as well as a server, capable of assisting communication devices in the suggested process are also suggested.

It should be noted that the examples mentioned herein illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

Figure 1:
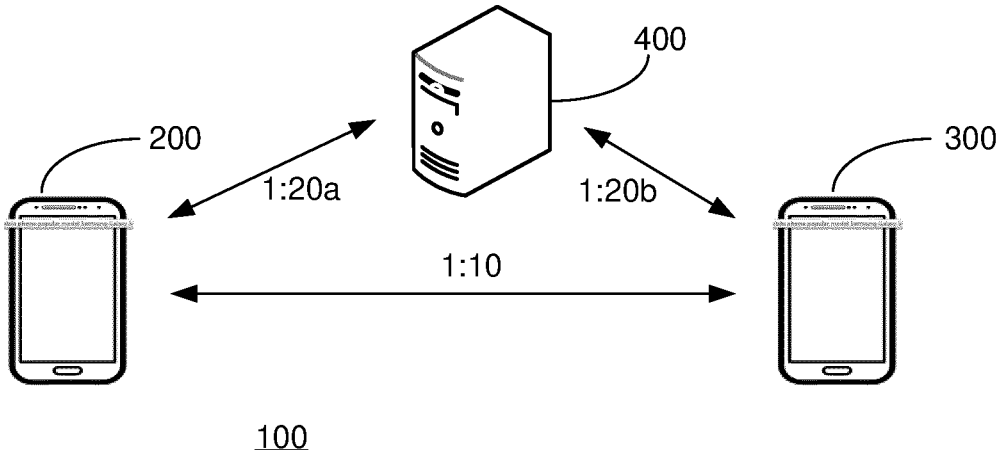
FIG. 1 is an illustration of a system, comprising two communication devices 200, 300, and a server 400, where the communication devices are capable of sharing content between each other in a controlled way, whereas the server 400 is capable of assisting in such a content sharing.

FIG. 1 is illustrating an overview of a system 100, comprising communication devices 200,300, capable of offering and controlling content, and of receiving controlled content, respectively, where controlled content may comprise content, such as e.g. digital documents, pictures or videos. The content may be shared via a direct communication link between the two communication devices 200, 300, as illustrated with device-to-device connection 1:10, or the content may be shared via a server 400, capable of assisting the two communication devices 200,300, via communication links 1:20a, 1:20b. Any type of conventional communication link, supported by any type of wireless communication network, including cellular networks, such as e.g. 2G, 3G, 4G or 5G, or short range networks, such as e.g. Bluetooth, Zigbee or nearfield communication may be applied.

Depending on the configuration, the sharing of content may be controlled from the first communication device 200, from the second communication device 200, from the server 400, or from two or even all three mentioned entities in combination. The content to be shared will be controlled based on sensor data captured at the first communication device 200, at the second communication device 300, or based on sensor data captured at both communication devices 200, 300. A reason for wanting to control shared content may e.g. be that content offered to a second communication device from a first communication device is to be offered only for a limited time, possibly also under the conditions that only certain functions, such as rendering of content, can be applied, whereas e.g. storing of the content is prohibited.

The suggested restrictions, or any other required restrictions, may be achieved e.g. by allowing the second communication device access to certain content only when a user of the first communication device is touching the touchscreen of the first communication device according to a certain pattern or sequence. A combination of various types of sensor data, such as e.g. a touch pattern in combination with a face ID, assuring that a specific person is interacting with a touch pad according to certain conditions, may alternatively be applied, e.g. in situations when a higher degree of security is required when content is to be shared between devices. Alternatively, corresponding conditions may be applied on the second communication device, or, according to yet another alternative, corresponding or different conditions may be applied on both devices. Thereby certain access to content on the second communication device will be permitted as long as the required, sensor based conditions are fulfilled, whereas access is limited or prohibited once at least one condition is no longer fulfilled, e.g. once a user of any of the communication devices no longer touches the touch screen as stipulated for full access. Sensor data may be found to fulfil one or more predetermined conditions when compared to at least one threshold value, or more complex conditions and combinations of sensor input may be considered.

Various sensors, such as e.g. acceleration or inertial sensors, capable of sensing e.g. the orientation of a communication device, touch sensors, capable of sensing e.g. touching of certain regions or patterns on a touch screen, a digital camera, capable of sensing e.g. a certain symbol, phase or image or tap strength sensors, capable of sensing e.g. a certain tap strength may be applied alone or in a combination. Alternatively, content may be controlled based on a combination of sensor data and other data, such as e.g. a timer value, allowing a user to e.g. render certain content for at least a certain time interval.

Sharing of content in a device-to-device communication, i.e. without involving any server, may be the preferred option e.g. in situations where no amendment or adaptation of the network infrastructure is wanted. In the latter situation it may be sufficient that both communication devices comprise an application or function, capable of executing the mentioned functionality when content is to be shared. In situations where e.g. the first communication device comprise required functionality, such as e.g. an application, whereas the second communication device does not, at the time of offering certain content to the second communication device, has access to, or capability to acquire relevant functionality, a server, comprising relevant functionality which is configured to operate on behalf of the first communication device, may instead come in handy and be the preferred solution. A server may also be suitable in situations where the content to be shared is provided from the server, which is also acting as a content provider, storing or having access to the mentioned content, whereas the first communication device may offer content linked to by the first communication device, wherein, whenever needed, the server can provide the second communication device also with required instructions or code, needed for acquiring access to the content.

However, in a typical scenario content shared by a user of the first communication device 200 is shared based on conditions stated by the first user, where such conditions may be chosen on a case-by-case basis, e.g. by the user of the first communication device 200, selecting from conditions presented on the display of the first communication device, or a sharing procedure may be executed according to conditions agreed upon in advance by the users of the first and the second communication device 200,300, such that e.g. the same conditions are always applied when content is shared between the first and the second communication device 200,300.

Figure 2A:
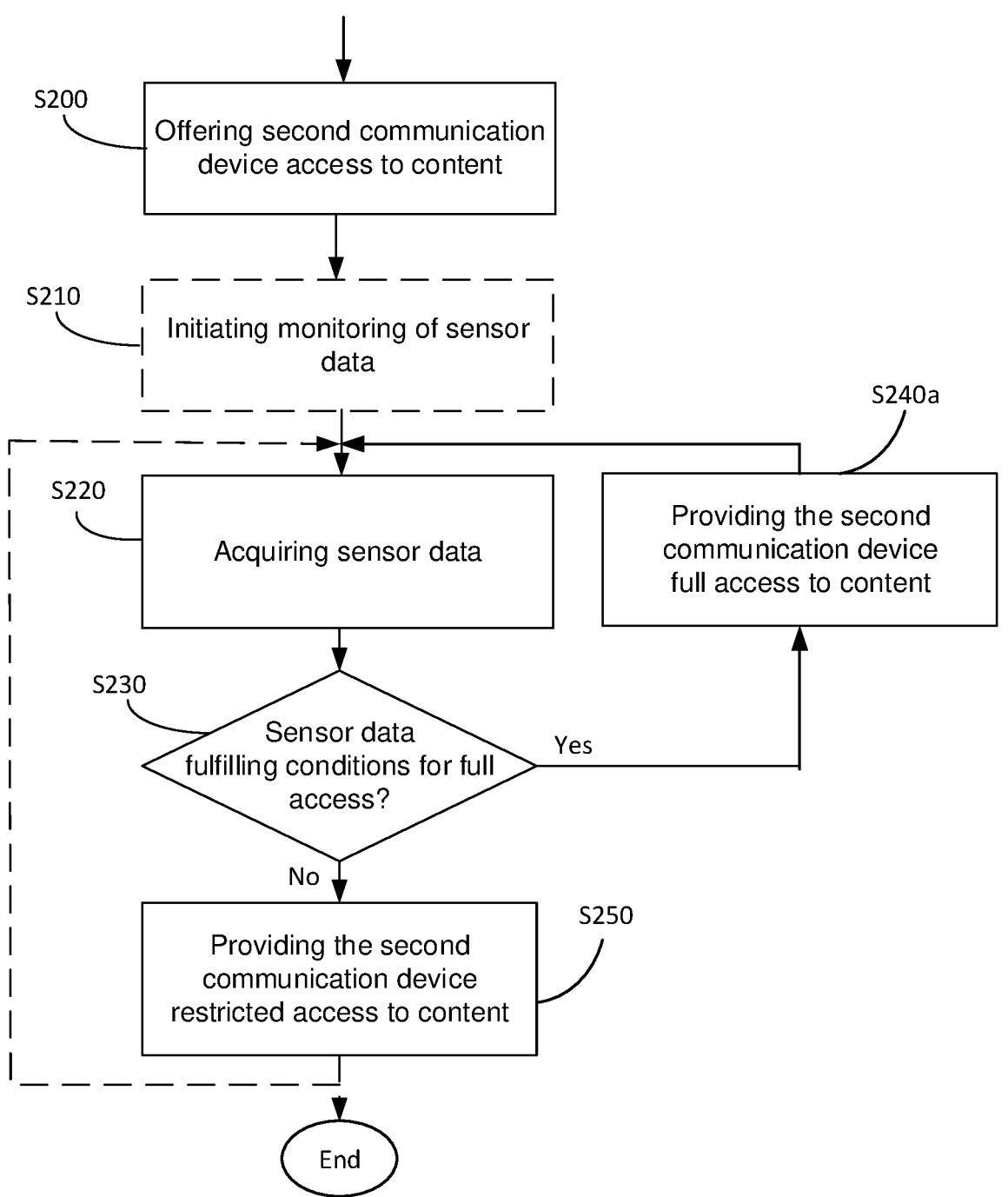
FIG. 2*a* is a flow chart of a method, executable in a communication device capable of providing another communication device access to content, according to one embodiment.

A method, executed at a communication device, herein referred to as a first communication device, capable of offering shared content to another communication device in a controlled manner will now be described in more detail, with reference to FIG. 2*a*. The suggested method may be executed by an application of function, available and executable at the first communication device. Alternatively, content may be shared, by setting up a communication between the two communication devices, where instructions or code, applicable for the respective content sharing process, is provided to the second communication device and possibly also to a server, thereby providing relevant instructions for the upcoming content sharing process to all entities involved. Alternatively, a combination of pre-installed functionality and selection and delivery of case relevant instructions may be applied. step S200, executed at an early stage of the suggested method, certain content is offered to the second communication device from the first communication device. This step may comprise an offer to share content which is initiated at the first communication device, e.g. by a user of the first communication device activating a dialogue on a User Interface (UI) of the first communication device, stating the specific content and conditions, which is then provided to the second communication device, so that the user of the second communication is made aware of the offer, e.g. via a text message, which can be rendered on another UI of the second communication device. Step S200 may comprise only one transmission step to the second communication device, e.g. as suggested above, or, alternatively, this step may be executed in combination with additional steps, together constituting a dialogue between the two communication devices, which typically results in an agreement on sharing content according to the stipulated conditions, before any actual content is being shared.

Step S200 may also comprise, or initiate forwarding of code or instructions to the second communication device, where the code or instructions is/are configured to allow at least some control of the access to the shared content also from the second communication device. The latter scenario provides an alternative to the scenario where access is completely controlled from the first communication device or from a server. As already mentioned above, any combination may also be applied, so that e.g. certain conditions has to be fulfilled both at the first communication device and at the second communication device for full or certain access to the shared content at the second communication device.

As an alternative to an offer, initiated from the first communication device, a request for certain content may initially have been sent from the second communication device to the first communication device, where an offering, according to step S200, is provided in response to an acceptance of the request, at the first communication device.

As already indicated above, the conditions for sharing content will comprise conditions which, to at least some extent, rely on sensor data captured at or by one or both of the communication devices, either alone or in combination with other conditions, such as e.g. a timer function, stating a minimum time for access to content. If sensor data of the first communication device is to be considered for how to restrict access to content, the first communication device may initiate monitoring of one or more categories of sensor data, captured at or by the first communication device, as indicated with step S210. It is to be understood that, alternatively, such monitoring may already have been initiated previously, or it may be initiated later, as long as it is executed such that relevant sensor data is made available to the first communication device. Alternatively, an already ongoing monitoring procedure may be updated to monitor e.g. at a higher frequency in response to having received an offer according to step S200. As an alternative to applying monitoring at the first communication device, the first communication device may be receiving sensor data, monitored at e.g. the second communication device, at regular time intervals.

According to another step S220, relevant sensor data is from now on acquired from one or both of the communication devices at a suitable frequency, where sensor data provided at a higher frequency is preferred e.g. if access is to be controlled or restricted within a short response time. In a typical scenario sensor data acquired by the first communication device is used for controlling under which conditions a user of the second communication device is to have full access to the mentioned content and when access is to be restricted, and possibly also to which extent the content is to be restricted, e.g. by a user of the first communication device, touching the touch screen of the first device according to a certain pattern.

If instead acquired sensor data has been captured at the second communication device and made accessible to the first communication device, e.g. by transmission of the sensor data or by remote access, sensor data of the second device will be decisive for how access to the content is provided from the first communication device. By way of example, the user of the second communication device may be required to hold the second communication device in such a way that the user is prohibited from activating any functionality on the device while rendering certain content on the display, wherein this may be assured e.g. by sensing that the user is holding the device with both hands, where fingers of a user are simultaneously touching certain regions of the touch screens, thereby prohibiting the user from initiating certain actions.

In a next step S230, it is determined if the captured sensor data, available to the first communication device, fulfil the conditions for full access to the content. If conditions for full access are fulfilled, as indicated with the "Yes" branch of step S230, full access to the content is provided to the second communication device, either directly, or via a server, as indicated with step S240a.

Content may be provided by the first communication device, transmitting the content direct to the second communication device until sensor data, available at the first communication device indicates that the conditions for full access to the content are no longer fulfilled. Alternatively, content is provided to a server, which is configured to forward the content to the second communication device according to instructions, or the content is already available at the server, and, once conditions are fulfilled, the content is also made available to the second communication device from the server.

Steps S220-240a are repeated until a change of at least some of the acquired sensor data indicates that the conditions for full access are no longer fulfilled. In case sensor data of the first communication device is considered, the user of the first communication device will be able to control the access of the content at the second communication device, whereas if only sensor data of the second communication device is considered, only the user of the second communication device will instead be able to control access to the content.

Once conditions for full access of the content at the second communication device are no longer fulfilled, as indicated with the "No" branch of step S230, the second communication device is instead provided restricted access to the content according to step S250. Also the restricted access can be provided either to the second communication device directly, or via a server, which is capable of providing the restricted access accordingly to the second communication device. The restricted access may be provided directly, or by providing an indication to restrict the access to the second communication device or the server, here constituting a receiving entity, with respect to the indication, where the receiving entity is capable of interpreting the indication as meaning that the access to the content is to be restricted in a specific way. The indication may be any type of indication, provided in a message to the receiving entity, which can be interpreted by the receiving entity, to indicate restricted access to the shared content, or, in other words, that changes in captured sensor data indicates a change in access to the content at the second communication device.

Restriction of access to content may mean anything from switching from full access to content to no access to any part of the content, wherein step S250 may be followed by repeating the method from step S220, until it is determined that the method is to be to be ended.

Figure 2B:
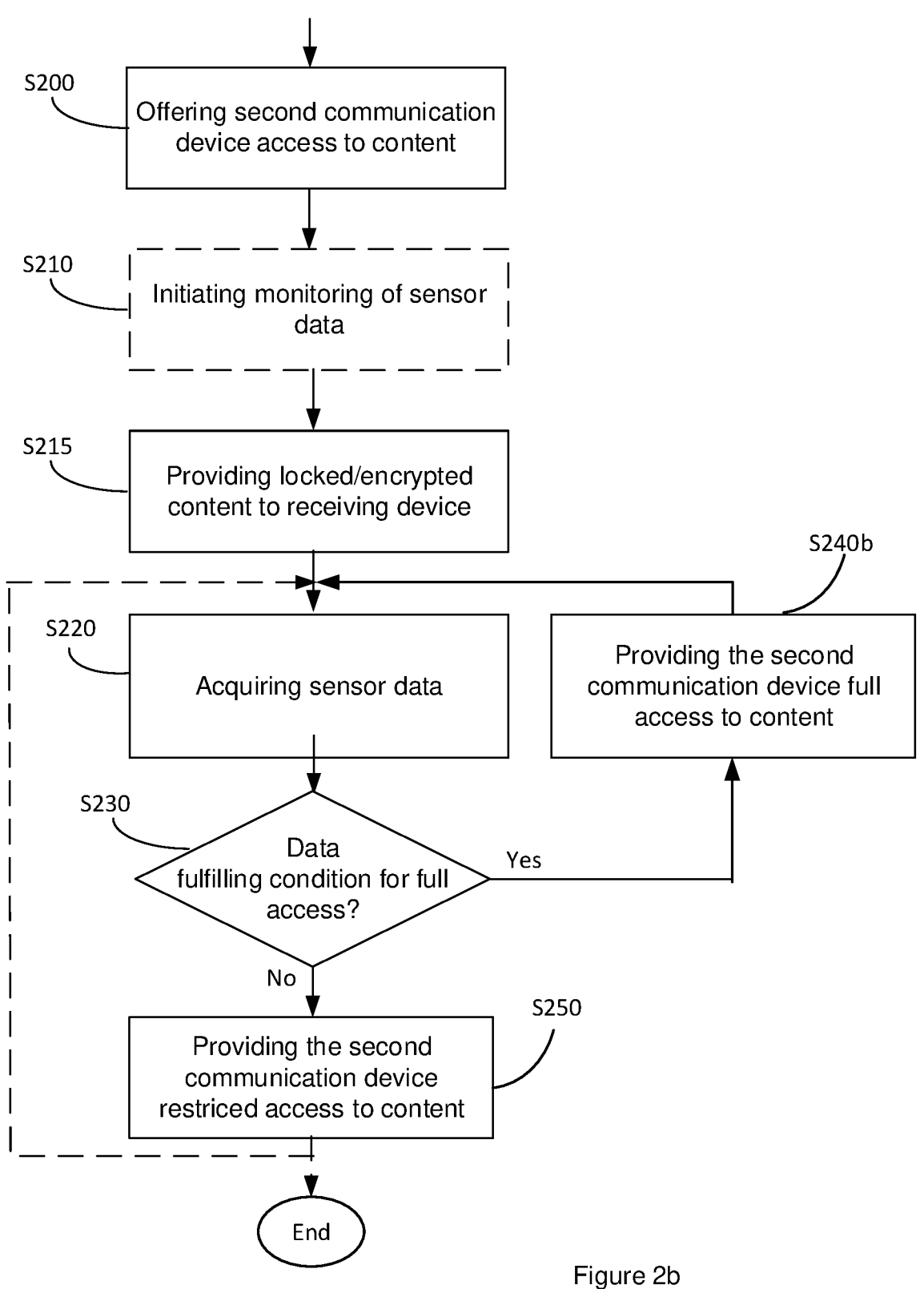
FIG. 2*b* is a flow chart of a method, executable in a communication device capable of providing another communication device access to content, according to another embodiment.

FIG. 2b is illustrating a method for sharing content, where the method is executed at a first communication device, according to a second embodiment. Only the steps which differs from the method of FIG. 2a, will be described herein. As indicated with step S215, the content to be shared is initially provided as locked and/or encrypted content to the second communication device, either directly, in case device-to-device communication is applied with respect to the sharing, or via a server, in case the content is made available to the second communication device via a server. Full access will be granted to the content when sensor data fulfil the required conditions for such access, according to the "Yes" branch of step S230. However, the present embodiment will also require that conditions for unlocking and/or decrypting the content are fulfilled, i.e. in addition to sensor data, also any data, such as e.g. credentials, shared between the first and the second communication device, needed for full access to unlocked and/or decrypted content at the second communication device, and available to the first communication device for evaluation need to fulfil required conditions, or the method will continue to step S250, providing maximum restriction, i.e. no access to content, whereas the method continues from step S220. As long as content is maintained locked and/or encrypted, step S250 will continue to be executed, providing maximum restrictions to the access. By repeating the method from step S320, detection of un-locked content and sensor data, allowing full or some degree of restriction to access, may lead to that the method continues to full access at step S340b, or less restricted access at step S350.

Conditions for unlocking and/or decrypting may have been provided to the second communication device e.g. in step S200, or alternatively in a separate step (not shown). Such conditions may e.g. have comprised an Unlock-Interaction Method (UIM), wherein step S200 or one or more separate steps may also have comprised an exchange of credentials between the two communication devices, required for enabling unlocking and/or decryption of the content.

Although step S215 is indicated as being executed between steps S210 and S220 in FIG. 2b, it is to be understood that, alternatively, step 215 may be executed after step S220, i.e. after acquiring of sensor data has been initiated. By applying the latter approach, content can be provided to a second communication device irrespective of whether or not any sensor based conditions are fulfilled, since the content will be available and ready for access at the second communication device but not be accessible to any user of the second communication device until conditions also for unlocking and/or decryption of the content have been fulfilled, in step S230. The approach mentioned above provides a more secure procedure for conditionally sharing content, since only a second communication device or a server, capable of un-locking and/or decrypting the content, will be able to actually access the content, irrespective of whether the sensor data fulfil its parts of the conditions or not.

A method executable at a communication device, from herein referred to as a second communication device, capable of being a recipient of content offered by another communication device, as suggested above, will now be described in further detail with reference to FIG. 3a. In a first step S300 an offer to access content is received at the second communication device. Such an offer may have been initiated at a first communication device, or it may have been preceded by a request for accessing certain content from a first communication device, which was sent by a user of the second communication device. As already mentioned above, the offer may also comprise reception of certain code or instructions, required for executing sharing of content as described herein.

In accordance with what has been described above, with reference to the first communication device, also the second communication device may initiate monitoring of sensor data, as indicated with optional step S310, if that has not already been done, and on the condition that sensor data of the second communication device is relevant for the mentioned content sharing. The mentioned monitoring may have been initiated from the second communication device, e.g. based on already available code or instructions, or according to instructions sent from the first communication device, e.g. as part of step S300. In another step S320 sensor data is acquired.

Typically the sensor data is sensor data acquired from sensors of, or connected to, the second communication device, where the sensor data may be of the same or different type as sensor data, acquired by the first communication device.

Alternatively, the second communication device may acquire sensor data from the first communication device, for evaluation at the second communication device. In another step S330, it is determined if the acquired sensor data is fulfilling one or more conditions for full content access. If the one or more required condition is fulfilled, as indicated with the "Yes" branch of step S330, the second communication device acquire full access to the content, as indicate with step S340a, i.e. the content is being received and can be handled according to the offer provided from the first communication device. Steps S320-340a are repeated until a change of at least some of the acquired sensor data indicates that the conditions for full access are no longer fulfilled.

When the acquired sensor data no longer fulfils the condition/s for full access, access to the content is restricted at the second communication device. Such a restriction may be executed by code or instructions, available at the second communication device, which recognizes the changed sensor data, or an indication, to restrict access, provided from the first communication device directly or via a server.

In case the second communication device is configured to handle locked and/or encrypted content, the method executed at the second communication device may be executed according to a second embodiment, which will now be described in further detail with reference to FIG. 3b, where only the steps which differs from the ones in FIG. 3a, will be described.

According to step S315, content which is locked and/or encrypted is received from the first communication device, or from a server, in case a server is providing content to the second communication device on behalf of the first communication device. The received content will remain locked and/or encrypted until acquired data indicates, in step S330, that the content can be unlocked and/or decrypted, and un-locked and/or decrypted content will be fully accessed, according to step S340b, in case also the acquired sensor data fulfil required conditions for full access, until a sensor data change is detected, or as restricted content, according to step S350. As long as content is maintained locked and/or encrypted, step S350 will be executed, providing maximum restrictions to the access. By repeating the method from step S320, detection of un-locked content and sensor data, allowing full or some degree of restriction to access, may lead to that the method continues to full access at step S340b, or less restricted access at step S350. As indicated above, with reference to FIG. 2b, content may be unlocked and/or decrypted e.g. after a dialogue between users of the first and the second communication device has resulted in that relevant credentials have been exchanged, and relevant security functions have been executed at the respective communication devices.

Figure 4A:
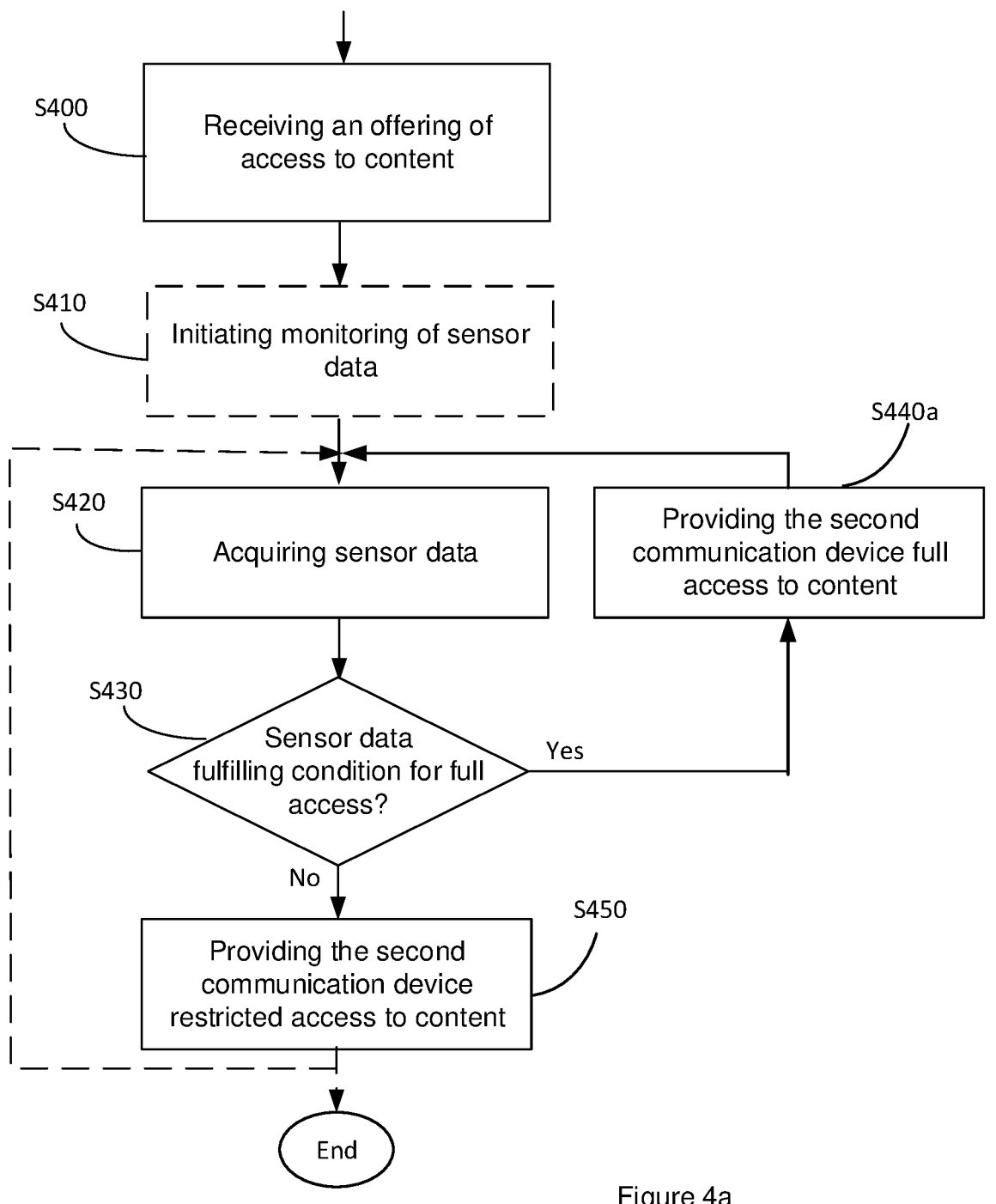
FIG. 4*a* is a flow chart of a method, executable at a server which is capable of assisting a communication device when it is offering content to another communication device, according to one embodiment.

As mentioned above, the suggested content sharing mechanism may, in addition to involving the two communication devices, also involve a server. A method executed in a server will therefore now be described in further detail with reference to FIG. 4a, where the server receives an offer of access to content from a first communication device, as indicated with step S400, where the offer is addressing a second communication device. As already mentioned above, such an offer may have been initiated from the first communication device, or it may have been initiated as a request for certain content, transmitted from the second communication device to the first communication device, which, if approved by a user of the first communication device, results in the offer of step S400.

As indicated with optional step S410, also the server may be involved in monitoring of sensor data, where, in a typical scenario, the server may monitor certain sensor data of a second communication device, once an offer, addressed to the second communication device, has resulted in an agreement between the two communication devices that content will be shared according to certain condition. Alternatively, sensor data of both the first and the second communication device may be monitored by the server, e.g. in case sensor data of both communication devices is to be evaluated with reference to certain conditions by the server, for determining when the server is going to provide the second communication device full access to content and when such access is to be restricted by the server.

In another step S420, relevant sensor data is acquired, e.g. from the monitored sensor data, as indicated in step S410, or by the first and/or the second communication device providing sensor data to the server at certain intervals. As indicated with step S430, the acquired sensor data is evaluated and compared to conditions, applicable for the content sharing process, and in case one or more conditions for full access is/are fulfilled, according to the "Yes" branch of step S430, the server provides the second communication device full access to the content, as indicated with step S440a, where such providing may comprise forwarding of content provided from the first communication device, or providing content, stored at the server, or accessible to the server from another storage, from such a storage to the second communication device.

When acquired sensor data indicates that one or more conditions for providing full access to the content is/are no longer fulfilled, as indicated with the "No" branch of step S430, the server will instead provide the second communication device restricted access to the content, as indicated by step S450. As already mentioned above, such a determination may be based on considerations made at the server, or based on an indication provided from the first communication device to the server. Consequently, the server may be configured to restrict access to the content due to decisions taken at the server itself, or due to decisions taken at one of the communication devices, such as e.g. the first communication device, or both of the communication devices.

Figure 4B:
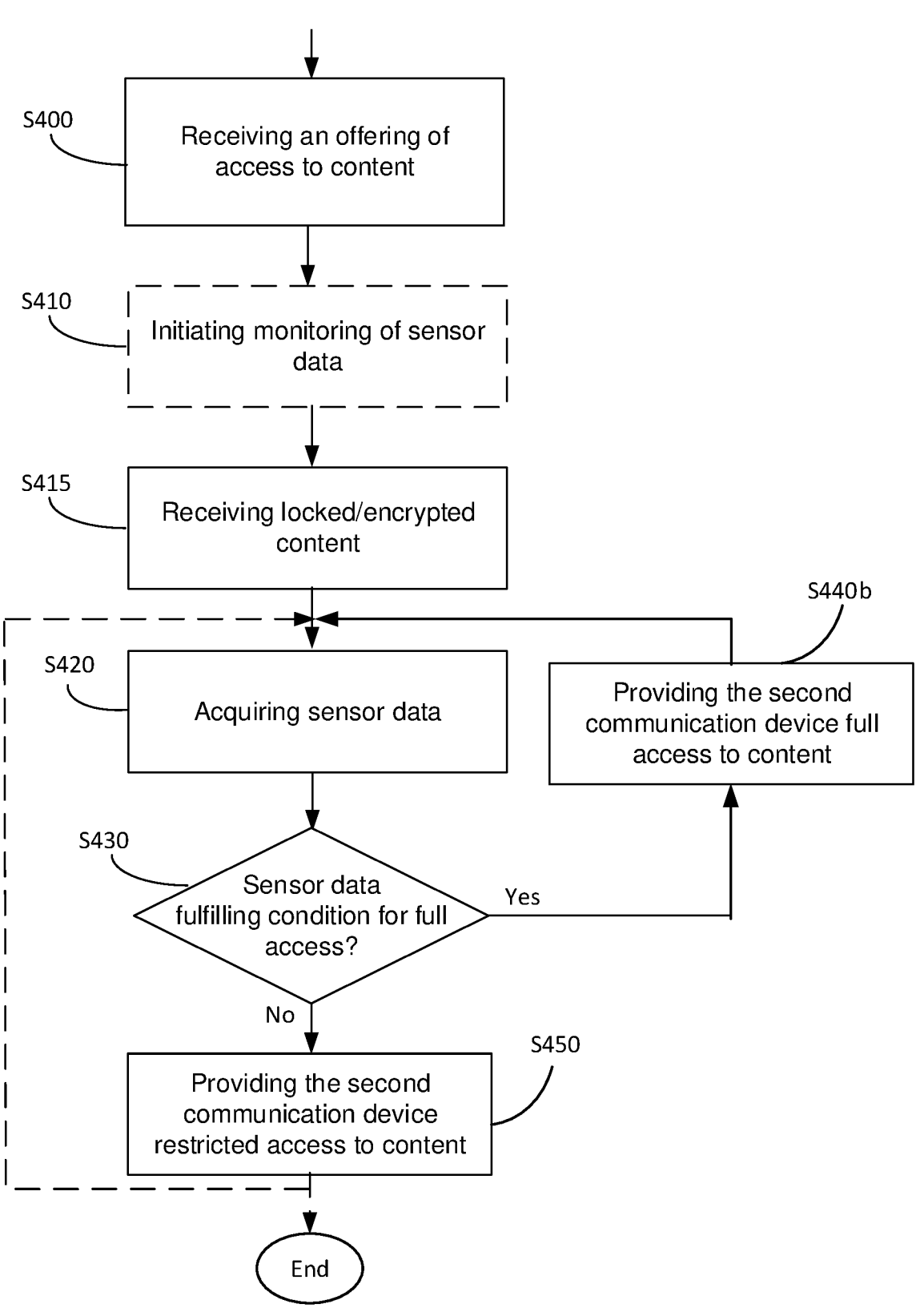
FIG. 4*b* is a flow chart of a method, executable at a server which is capable of assisting a communication device when it is offering content to another communication device, according to another embodiment.

Also a server may be configured to handle locked and/or encrypted content to be offered from one communication device to another communication device. Therefore, an alternative method, for handling such content at a server will now be described in further detail according to another embodiment, with reference to FIG. 4b, where only steps which differ from the steps of FIG. 4a will be described here. According to step S415, content is received in the form of locked and/or encrypted content. This locked and/or encrypted content may be forwarded to the second communication device, so that it is available at, but not accessible to the second communication device, or it may be stored at the server, until sensor data available to the server indicates that the server now can provide for access to the second communication device, i.e. arrange so that the second communication device can access un-locked and/or decrypted content, when both the conditions for un-locking and/or decryption and for the sensor data are fulfilled. More specifically, the server may either provide un-locked and/or decrypted content to the second communication device, e.g. if locked and/or encrypted content has been stored at the server, or the server may transmit an indication to the second communication device to un-lock and/or decrypt locked and/or encrypted content, available at the second communication device. In the latter situation, it is assumed that credentials required for un-locking and/or decrypting content have been exchanged between the second communication device and the first communication device or the server, before any access can be provided, according to what has been presented above, with reference to handling of locked and/or encrypted content, i.e. access to content will be fully restricted as long as the content remains locked and/or encrypted, whereas full access, according to step S440b or less restricted access to content, according to step S450 is provided, once the content has been un-locked and/or decrypted and the sensor data fulfils the requirements for access to the content.

As is evident from what has been mentioned above, content may, according to one embodiment, be offered to a user of a second communication device by a user of a first communication device in a device-to-device communication. Such a scenario will now be described in further detail with reference to the signalling scheme of FIG. 5a. In a first step 5:100 an offer of content is provided from the first communication device 200 to the second communication device 300. As already mentioned above, such an offer may have been initiated at the first communication device, as indicated in the figure, or such an offer may alternatively have been preceded by a dialogue (not shown) between the first and the second communication device, initiated as a request for certain content at the second communication device, where such a request is accepted in step 5:110, thereby verifying to the first communication device that the user of the second communication device has accepted to share content according to the conditions, associated with the offer. Such conditions may have been exchanged between the two devices as part of step 5:100, or they may have been agreed on at an earlier occasion, and, thus, verified in step 5:110.

Once both communication devices 200, 300 are aware of that a content exchange, involving certain conditions, is to be executed, one or both devices 200, 300 may initiate acquiring of relevant sensor data, as indicated with optional steps 5:120a and 120b. Although not shown, one or both devices may also initiate monitoring of certain sensor data or one or more parameters, which may be relevant for determining when access to the content is to be restricted at the second communication device. Alternatively, or in combination one or both devices 200, 300 may receive sensor data, captured by the other device.

In a typical scenario it is determined, at the first communication device 200, that the second communication device shall be provided full access to the content, as indicated with optional step 5:130a, based on the acquired sensor data. Alternatively, a corresponding decision to access content can be taken at the second communication device 300, as indicated with optional step 5:130b. The former scenario is preferred when the user of the first communication device 200 wants to control access to the content for the second communication device 300, whereas the latter scenario can be applied in situations where the user of the first communication device 200 trusts the user of the second communication device 300 to such an extent that a determination of level of access can be taken at the second communication device 300. Once a decision that access to content shall be provided to the second communication device 300 has been taken, access to the content in question is provided from the first 200 to the second communication device 300, as indicated with step 5:140. Access may be provided e.g. by transmitting the content to the second communication device 300. Alternatively, the content may already have been provided to the second communication device 300 earlier, such as e.g. after step 5:110, but access to such content may not be possible for the second communication device 300 until some indication to provide access is received from the first communication device 200, wherein such an indication is interpreted by an application, function or code, available at the second communication 300, as an indication that the content should from now on be fully accessible at the second communication device 300. As indicated with another step 5:150, the second communication device acquire full access to the content, until it is determined at any of the first 200 and the second communication device 300, according to any of optional steps 5:160a and 5:160b that, based on sensor data available at the respective communication device 200, 300, access to the content shall from now on be restricted. Also at this stage it is to be understood that, alternatively, any of steps 5:160a and 5:160b could be preceded by an exchange of sensor data or data associated to acquired sensor data, between the two communication devices 200, 300.

As indicated with optional step 5:170, a determining to restrict access, according to step 5:160a, may be followed by the first communication device 200 providing the second communication device 300 restricted access to the content, by the first communication device 200 providing an such an indication or restricted content as such, to the second communication device 300. As indicated with step 5:180 restriction of access to content is being executed at the second communication device 300, either as a result of actually receiving restricted content from the first communication device 200, or in response to interpreting an acquired indication as an instruction to restrict the access.

Figure 5A:
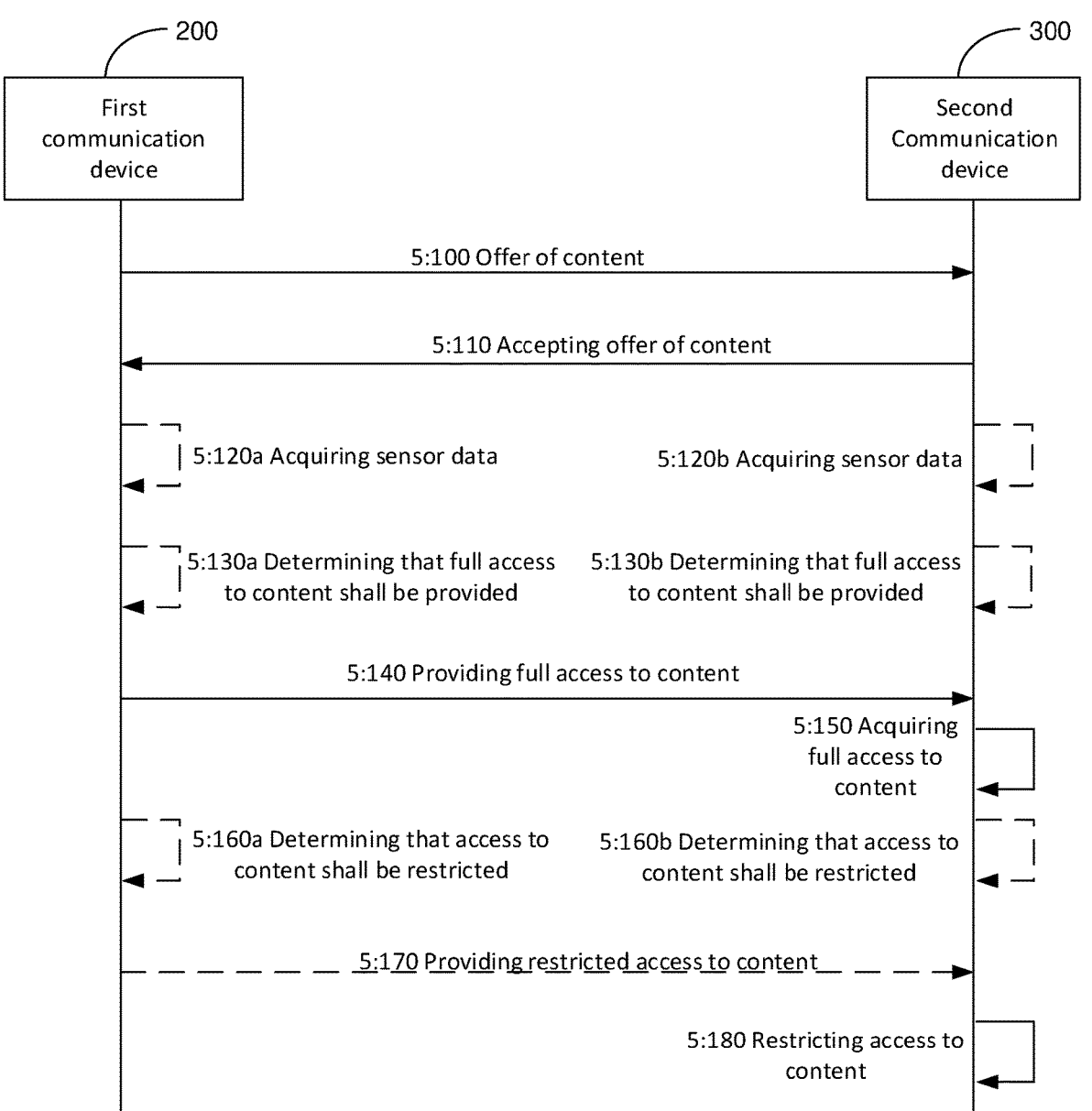
FIG. 5*a* is a signalling scheme, illustrating a process for providing content from a first communication device to a second communication device, according to one embodiment.
Figure 5B:
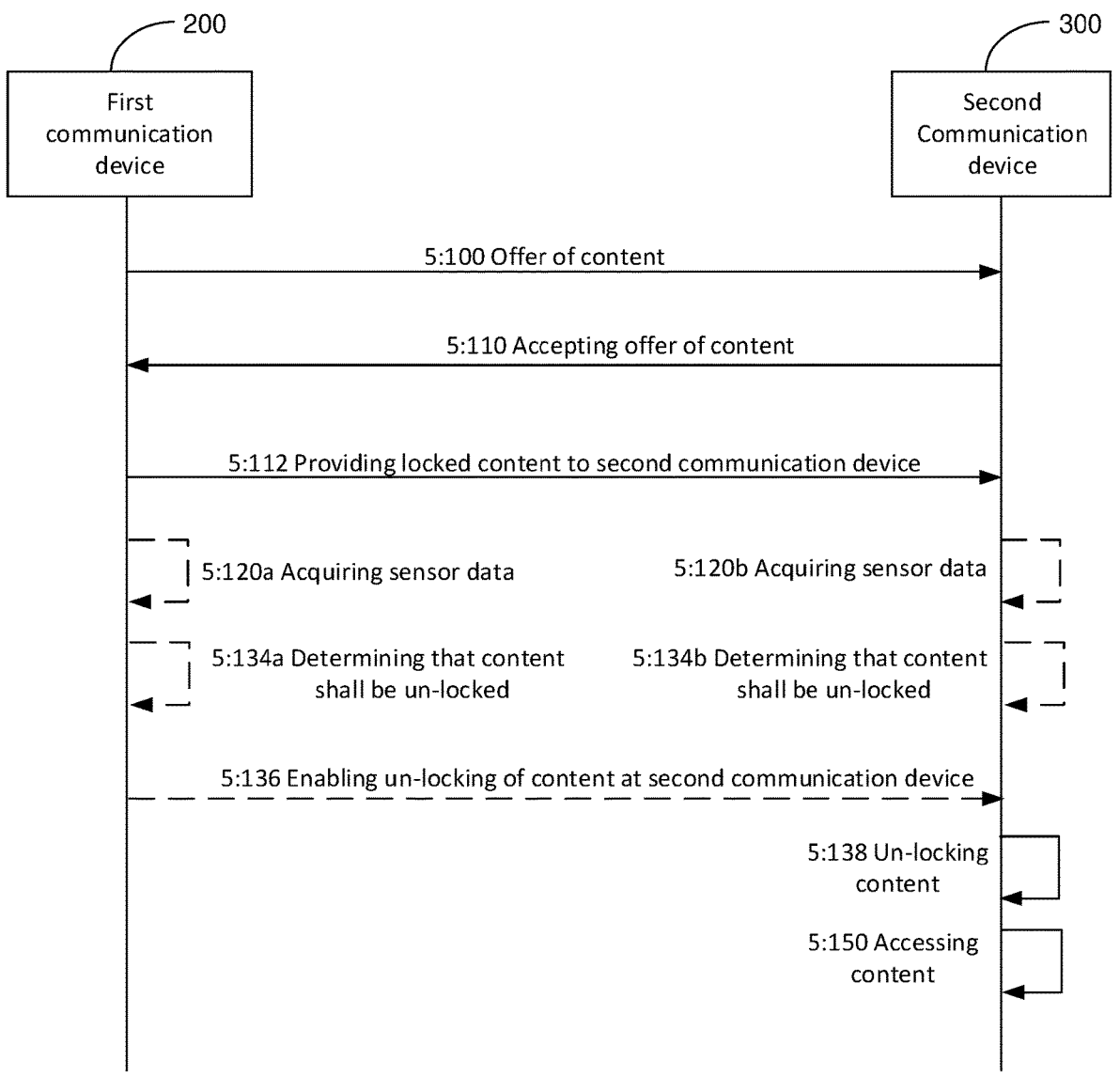
FIG. 5*b* is a signalling scheme, illustrating a process for providing content from a first communication device to a second communication device, according to another embodiment.

FIG. 5b is illustrating a signalling scheme, which corresponds to the signalling scheme of FIG. 5a, with the exception that FIG. 5b is illustrating a scenario where locked content is applied. A similar approach may be applicable if content is encrypted. Only steps which differs from the steps of FIG. 5a will be described. After an offer has been provided in step 5:100 and accepted in step 5:110, locked content is provided to the second communication device, according to step 5:112, i.e. the content is made available to but not accessible to the second communication device 300.

Once sensor data has been acquired according to one or more of optional steps 5:120a and 5:120b, this sensor data will eventually be construed as allowing the content to be unlocked, as indicated by one or both of optional steps 5:134a and 5:134b, where the latter steps are to be construed such that any of the first or second communication device has determine that the content, available at the second communication device 300 shall now be un-locked, since the conditions for doing that has been fulfilled. It is to be understood that, although not shown, any applicable step of these mentioned steps may also comprise, or be preceded by an exchange of relevant credentials, required for unlocking the content, between the two devices.

In case step 5:134a is executed, i.e. a decision to un-lock the content is taken at the first communication device 200, such a step is typically followed by step 5:136, where un-locking of the content is enabled from the first communication device 200, by providing an indication or instruction to do so, from the first 200 to the second communication device 300. The second communication device 300 responds to such an indication, by un-locking the content, according to step 5:138 and accessing the content, according to step 5:150, in case also the acquired sensor data meet with the relevant requirements. After this step, full access may continue to apply or access to content may be restricted, according to the steps 5:150-5:180 of FIG. 5a, when acquired sensor data changes accordingly.

If also a server 400 is involved in the suggested content sharing process, such a process may instead be executed according to the signalling scheme described with reference to FIG. 6a. In a first step 6:100 an offer of content is provided from a first communication device 200, wanting to offer content to a second communication device 300, to the server 400, after which that offer is forwarded to the second communication device 300, in another step 6:110. In subsequent steps 6;120 and 6:130, the offer is accepted by the second communication device 300 and sent to the server 400, after which it is forwarded from the server 400 to the first communication device 200, respectively. Such accepting may comprise additional signalling between the involved entities, if required.

Figure 6A:
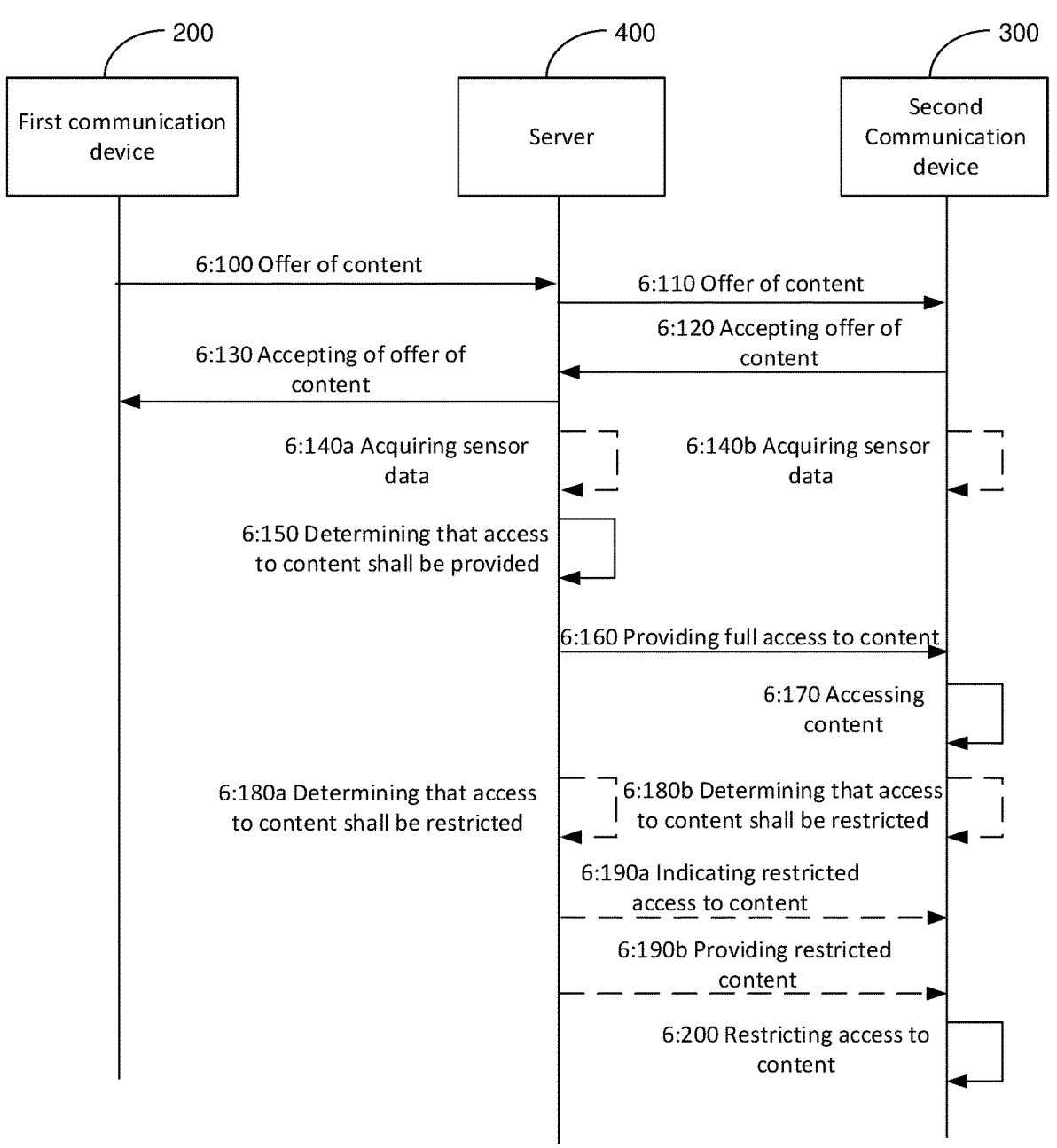
FIG. 6*a* is a signalling scheme, illustrating a process for providing content from a first communication device to a second communication device, with the assistance of a server, according to one embodiment.

According to FIG. 6a, sensor data is acquired by one or more of the server 400 and the second communication device 300. Here it is to be understood that the sensor data acquired at the server 400 in step 6:140a is sensor data derived at, at least, one of the first 200 and the second 300 communication device. According to step 6:150 sensor data available at the server 400 is used as a trigger for determining that access to the offered content shall be provided to the second communication device 300, leading to that full access to the content is provided by the server 400, as indicated with another step 6:160, e.g. by providing an indication or the actual content to the second communication device 300. As indicated with step 6:170, content is made fully accessible at the second communication device 300, e.g. by an application, function or code, available at the second communication device 300. Steps 6:140-6:170 are then repeated as long as sensor data is indicating that the second communication device 300 should have access to the content.

However, whenever it is determined in the server 400 or the second communication device 300, that access to the content shall be restricted, due to that respective sensor data does no longer fulfil the requirements for access, according to either step 6:180a or step 6:180b, respectively, the second communication device 300 may be instructed of this in optional step 6:190a, after which access to the content is restricted, as indicated with step 6:200. Alternatively, restricted content is provided from the server 400 to the second communication device 300, as indicated with optional step 6:190b, after which the provided content is accessed in a restricted way, according to step 6:200.

Figure 6B:
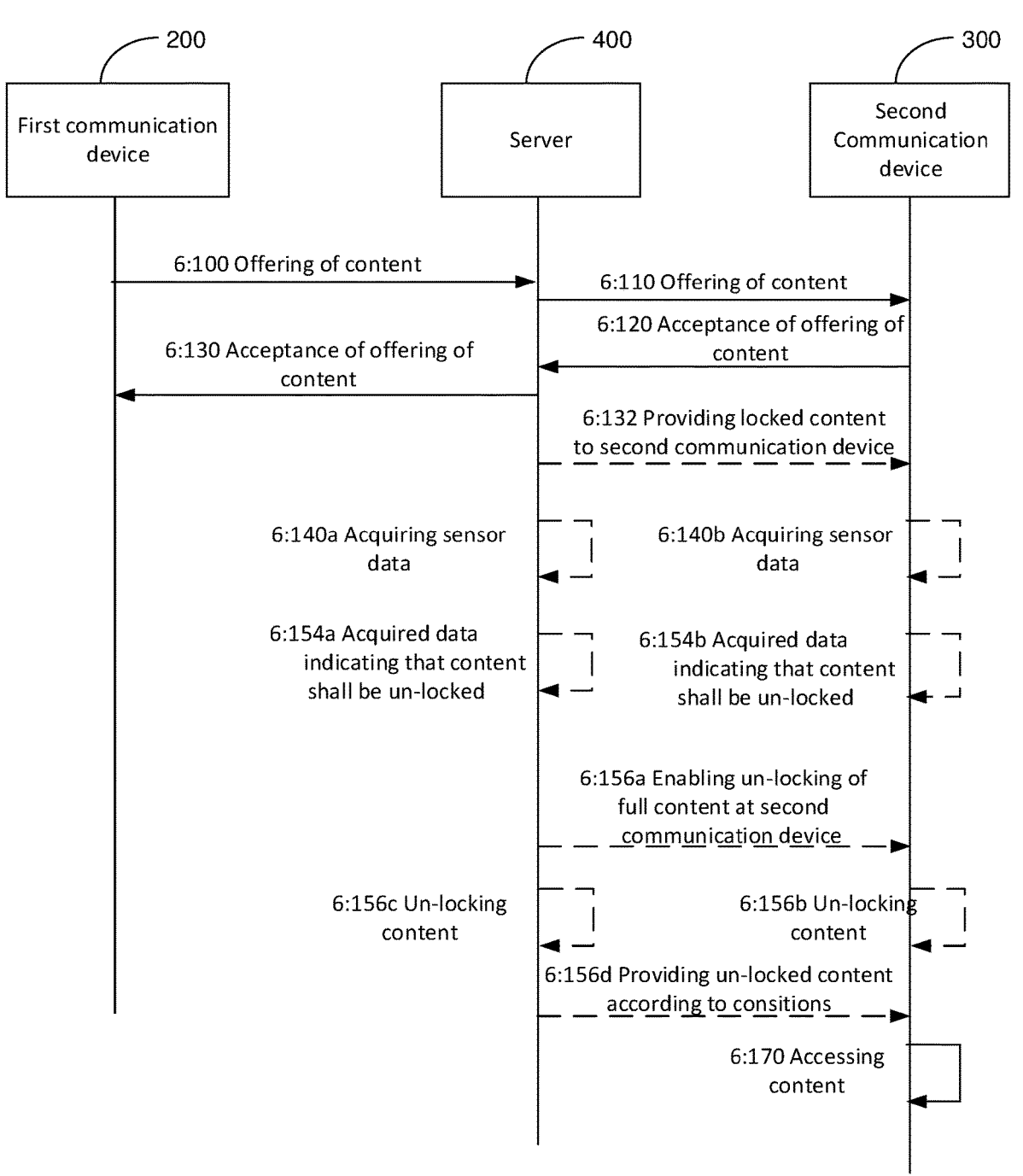
FIG. 6*b* is a signalling scheme, illustrating a process for providing content from a first communication device to a second communication device, with the assistance of a server, according to another embodiment.

As already mentioned, also a server 400 may be configured to handle locked content, whereas encrypted content may be handled in a corresponding way. Such a scenario will now be described in further detail with reference to the signalling scheme of FIG. 6b, where only steps which differ from the steps of FIG. 6a will be described here.

In optional step 6:132 locked content is provided from the server 400 to the second communication device 300. Alternatively, the locked content can be stored at the server 400 until it is un-locked and made available at the second communication device 300, or it can be provided to the second communication device 300 at a later stage. According to optional steps 6:140a and 6:140b, either the server 400, the second communication device 300, or both may acquire sensor data to be used for the upcoming evaluation process. At some time instant either the server 400 or the second communication device 300 acquire data which is indicating that the content shall now be un-locked, as indicated with optional steps 6:154a and 6:154b.

If the locked data is stored at the server 400, execution of step 6:154a is more likely, whereas if the locked content has already been provided to the second communication device 300, execution of step 6:154b is more likely. In the former scenario, in a situation where locked data is already at the second communication device 300, the server 400 now enables un-locking of content at the second communication device 300, as indicated with optional step 6:156a, e.g. by providing an indication, such as e.g. a flag, or other setting, to the second communication device 300, which the second communication device 300 can interpret as an indication to un-lock content, after which the content is un-locked at the second communication device 300, as indicated with optional step 6:156b. If instead the locked content is available at the server 400 but not at the second communication device 300, step 6:154a will trigger un-locking of the content at the server 400, according to step 6:156c, after which the now un-locked content is provided to the second communication device 300, according to step 6:156d. The second communication device 300 responds to any of the mentioned options by accessing the un-locked content, e.g. by rendering it, according to step 6:170. After this step, access to content may be restricted at the second communication device 300, according to any of the embodiments described above.

Figure 7:
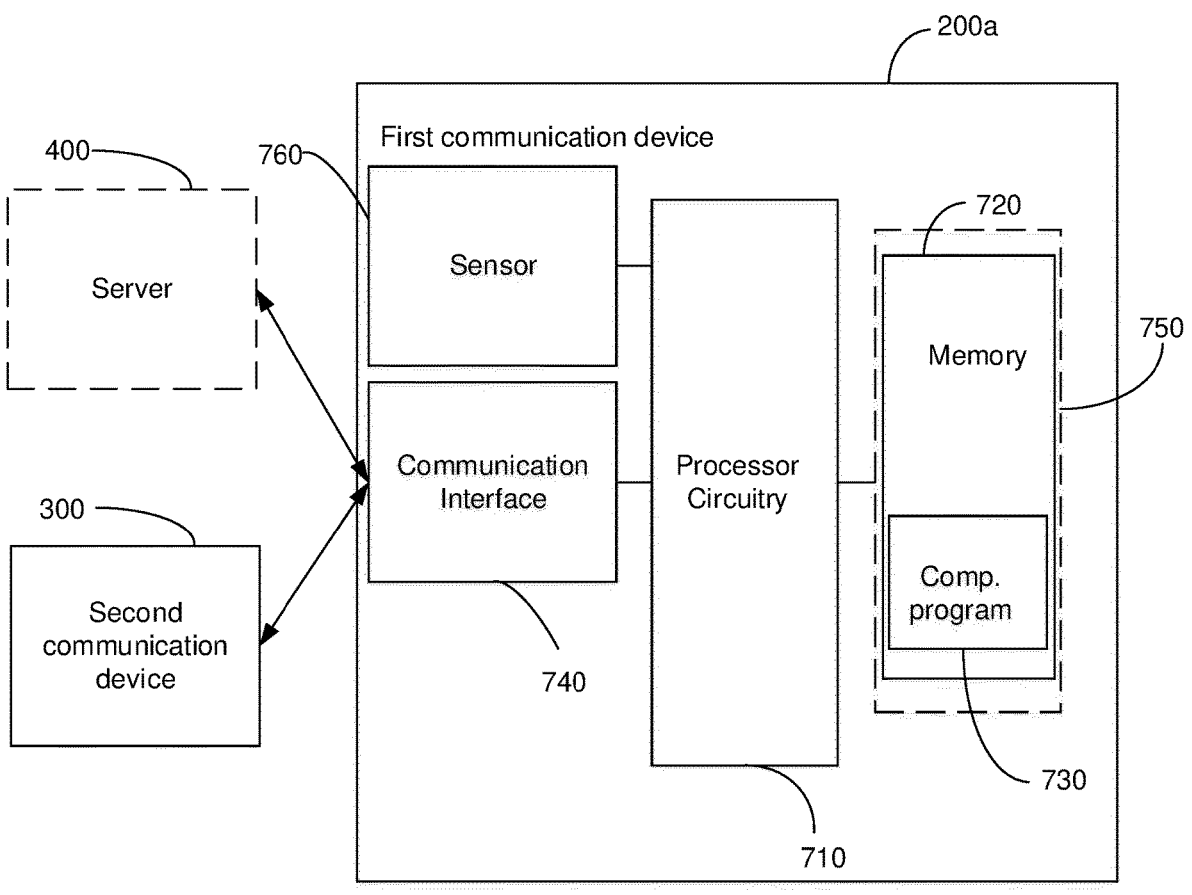
FIG. 7 is a block scheme of a first communication device, capable of offering content to a second communication device, where the first communication device is arranged according to a first aspect.

A communication device, capable of offering another communication device access to content, according to a method such as the one suggested above with reference to FIG. 2a or 2b, according to a first aspect, will now be described in further detail with reference to FIG. 7, where, for conformity with the remaining text, the communication device is referred to as a first communication device 200a.

The first communication device 200a, comprises processing circuitry 710 and a memory 720, comprising executable instructions, which when executed by the processing circuitry 710, is configured to cause the first communication device 200a to provide an offer to the second communication device 300, offering the second communication device 300 access to the content, wherein access to the content is conditional based on sensor data of at least one of the first 200a and the second communication device 300. The first communication device 200a is also caused to acquire sensor data of at least one of the first 200a and the second communication device 300 and to either provide the second communication device 300 full access to the content, in case it is determined that the sensor data of at least one of the first 200a and the second communication device 300 indicates that the second communication device 300 shall be granted full access to the content, or to determine that access to the content is to be restricted at the second communication device 300 and provide the second communication device 300 restricted access to the content, in case it is determined that sensor data of at least one of the first 200a and the second communication device 300 is indicating that access to the content is to be restricted at the second communication device 300. The first communication device 200a is capable of communicating with the second communication device 300 and, if applicable, also a server 400, via a communication interface 740, according to an applicable communication protocol. Sensor data acquired by the first communication device 200a, may be acquired from one or more sensors comprised on the first communication device 200a, here represented by sensor 760, connected to the first communication device (not shown), or provided as a combination of both.

The memory 720 can be any combination of random access memory (RAM) and/or read only memory (ROM). The memory 720 also comprises persistent storage, which, for example, can be any single one or combination of magnetic memory, optical memory, solid-state memory or even remotely mounted memory. The processing circuitry 710 may comprise e.g. one or more central processing unit (CPU), multiprocessor or digital signal processor (DSP). The first communication device 200a also comprise transmitting and receiving functionality, here represented by communication interface 740, for enabling communication with the second communication device 300 and server 400.

The computer readable instructions, configured to provide the functionality as described herein may be provided as a computer program 730, in the form of a computer program product 750, where the computer program product may be e.g. an optical disc, such as a Compact Disc (CD), a Digital Versatile Disc (DVD) or a Blu-Ray disc.

According to one embodiment, the first communication device 200a is configured to monitor at least part of the sensor data at, at least one of the first 200a and the second communication device 300.

According to one embodiment, the first communication device 200a is configured to provide the offer to the second communication device 300 in an invitation to the second communication device 300, i.e. the suggested method is initiated at the first communication device 200a, whereas according to another embodiment, the first communication device 200a is instead configured to provide the offer to the second communication device 300 in a response to having received a request for said content, from the second communication device 300, i.e. the suggested method is initiated at the second communication device 300.

Content may be offered on the condition that a certain level of security is applied, where an indication of an Unlock-Interaction Method (UIM), an encryption method to be applied by the second communication device 300 or a combination of both is provided from the first communication device 200a to the second communication device 300 or a server 400, herein referred to as a receiving entity 300, 400.

If an UIM is provided, the first communication device 200a may, according to one embodiment, be configured to initially provide the content to the receiving entity 300,400 as locked content, i.e. content that the second communication device 300 cannot access, until it is capable of unlocking the content. In order to provide for the latter scenario, the first communication device may be configured to initiate a UI with the receiving entity 300, 400 and to unlock the content at the receiving entity 300,400, in response to recognizing data of at least one of the first 200a and the second communication device 300, indicating that the content is to be un-locked, i.e. when the recognized data fulfills conditions for un-locking the content. In the latter scenario, the mentioned data may comprise data associated with credentials, which have been exchanged between the two communication devices 200a, 300, alone, or it may comprise credentials in combination with sensor data, fulfilling certain conditions.

According to one embodiment, the first communication device 200a is configured to provide code, one or more parameters, or a combination of both, where the code and/or parameter(s) is/are decisive of at least one condition for when access to the content is to be restricted at the second communication device 300, to the second communication device 300. According to another embodiment, relevant code and/or parameter(s) may already be available at, or accessible to the second communication device 300, e.g. via an application or function of the second communication device 300.

The first communication device 200a may be configured to provide data to the second communication device 300, which is indicating at least one condition for decrypting the content, wherein dynamic conditions for decryption, relying e.g. to at least some extent on sensor data, may be applied.

The first communication device 200a is configured to acquire relevant sensor data, where the sensor data may comprise e.g. one or more of orientation sensor data, touch pattern data, symbol data, face identity data, and tap strength sensor data.

The first communication device 200a is configured to recognize sensor data of at least one of the first 200a and the second communication device 300 as indicating that access to the content is to be restricted at the second communication device 300 when the acquired sensor data is identified by the first communication device 200a to conform to at least one of some predetermined characteristics, where such characteristics may comprise one or more of a touch pattern, a symbol, a face identity, a tap strength, an orientation of the device, an eye gaze and/or a pose of a user of at least one or the first and the second devices 200a, 300, or the fulfillment of at least one predetermined condition, when compared to at least one threshold value.

Figure 8:
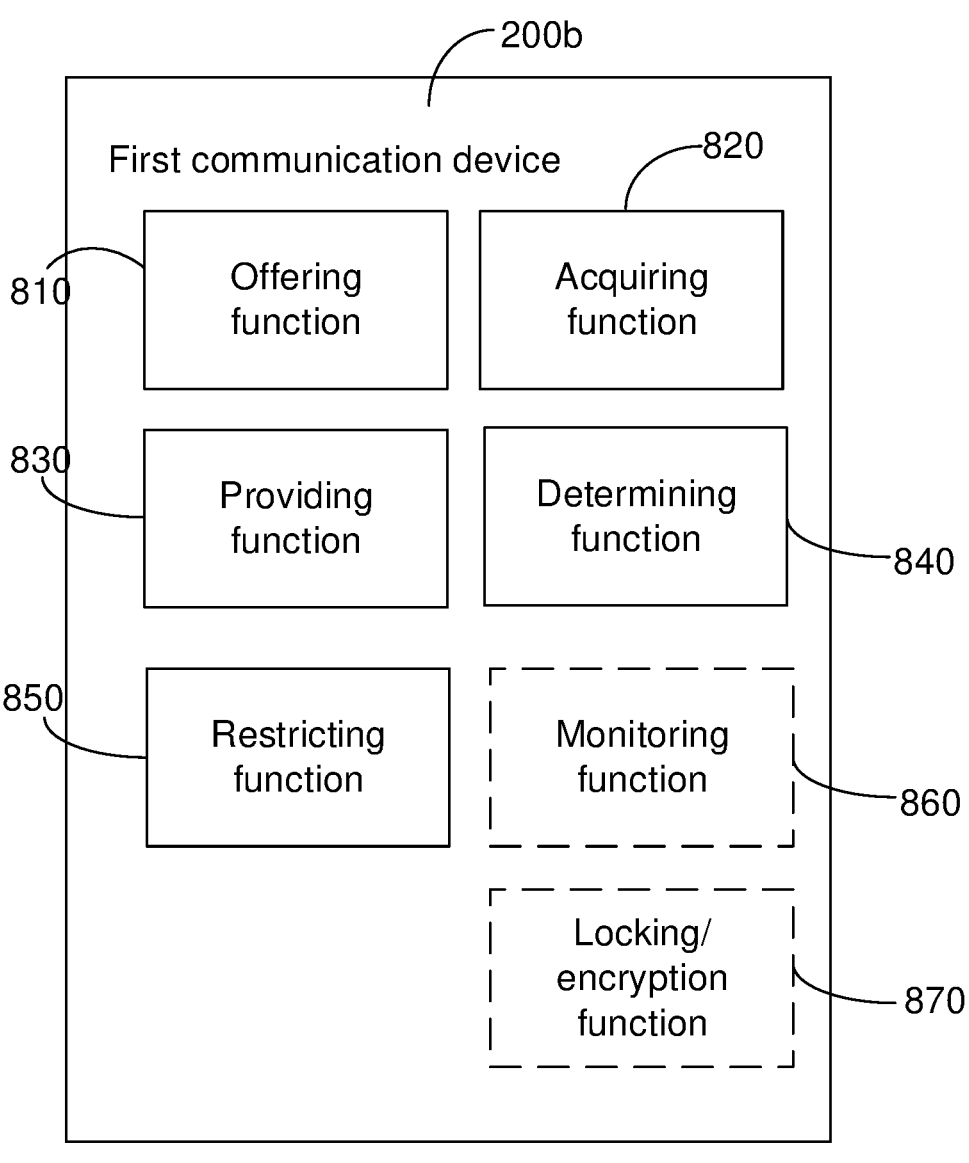
FIG. 8 is a block scheme of a first communication device, capable of offering content to a second communication device, where the first communication device is arranged according to a second aspect.

According to another aspect, a first communication device 200b, capable of executing the method according to any of FIG. 2a or 2b, will now be described in further detail with reference to FIG. 8, where the first communication device 200b comprise an offering function 810, configured to provide an offer to the second communication device 300, offering the second communication device 200b conditional access to the content, wherein access to the content at the second communication device 200b is adaptable based on sensor data of at least one of the first and the second communication device 200b, 300, corresponding to step S200 of FIG. 2a or 2b. The first communication device 200b also comprise an acquiring function 820, configured to acquire sensor data of at least one of the first and the second communication device 200b, 300, corresponding to step S220 of FIG. 2a or 2, and a providing function 830, configured to provide the second communication device 300 full access to the content, corresponding to step S240a of FIG. 2a or S240b of FIG. 2b, in case it is determined, by a determining function 840, that the sensor data of at least one of the first and the second communication device 200b, 300 indicates that the second communication device 200b shall be granted full access to the content, corresponding to step S230 of FIG. 2a or 2b, or that access to the content is to be restricted at the second communication device 300, corresponding to step S230 of FIG. 2a or 2b, wherein a restricting function 850 is configured to provide the second communication device 300 restricted access to the content, in case it is determined, by the determining function 840 that sensor data of at least one of the first and the second communication device 200b, 300 is indicating that access to the content is to be restricted at the second communication device 300, corresponding to step S250 of FIG. 2a or 2b. The first communication device 200b may also comprise a monitoring function 860, configured to monitor sensor data, as described herein, and a locking and/or encryption function 870, configured to enable locking and/or encryption of content as described herein.

Figure 9:
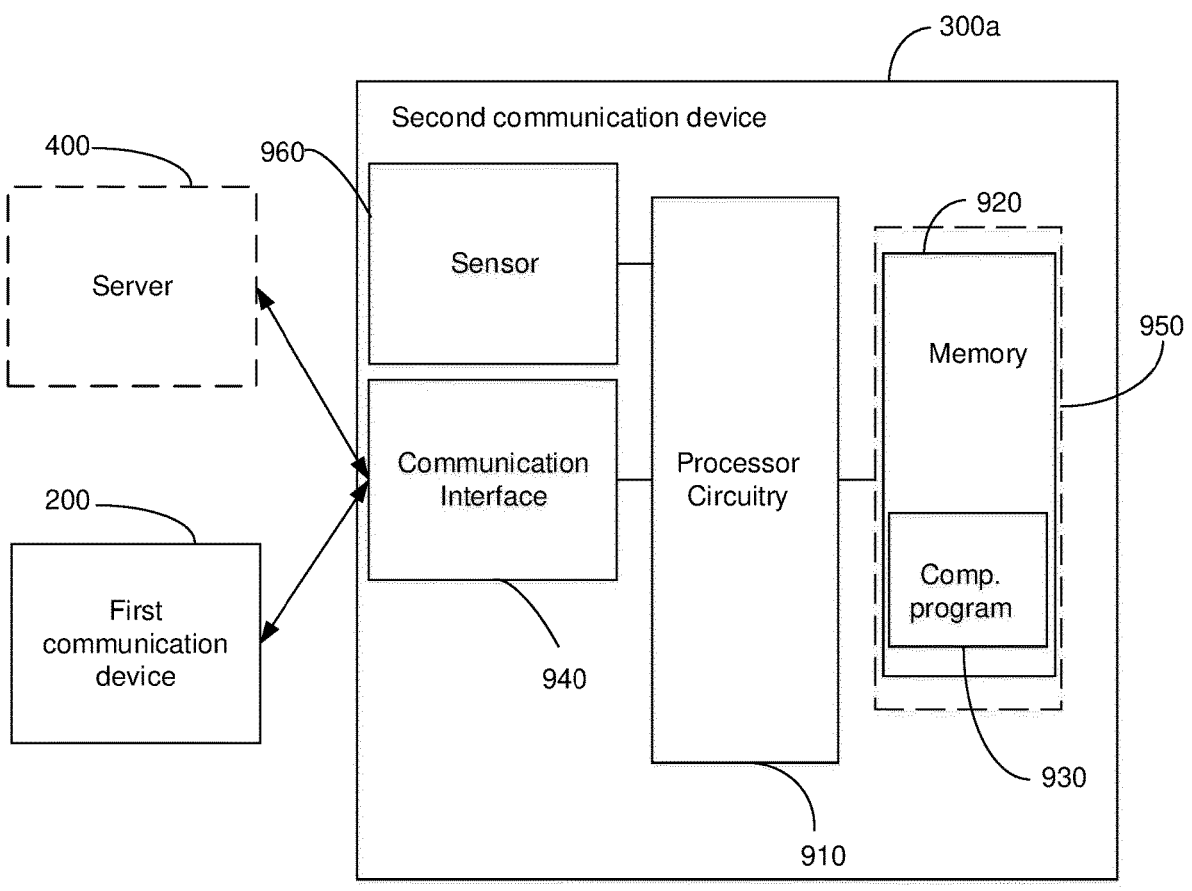
FIG. 9 is a block scheme of a second communication device, capable of receiving content from a first communication device, where the second communication device is arranged according to a first aspect.
Figure 10:
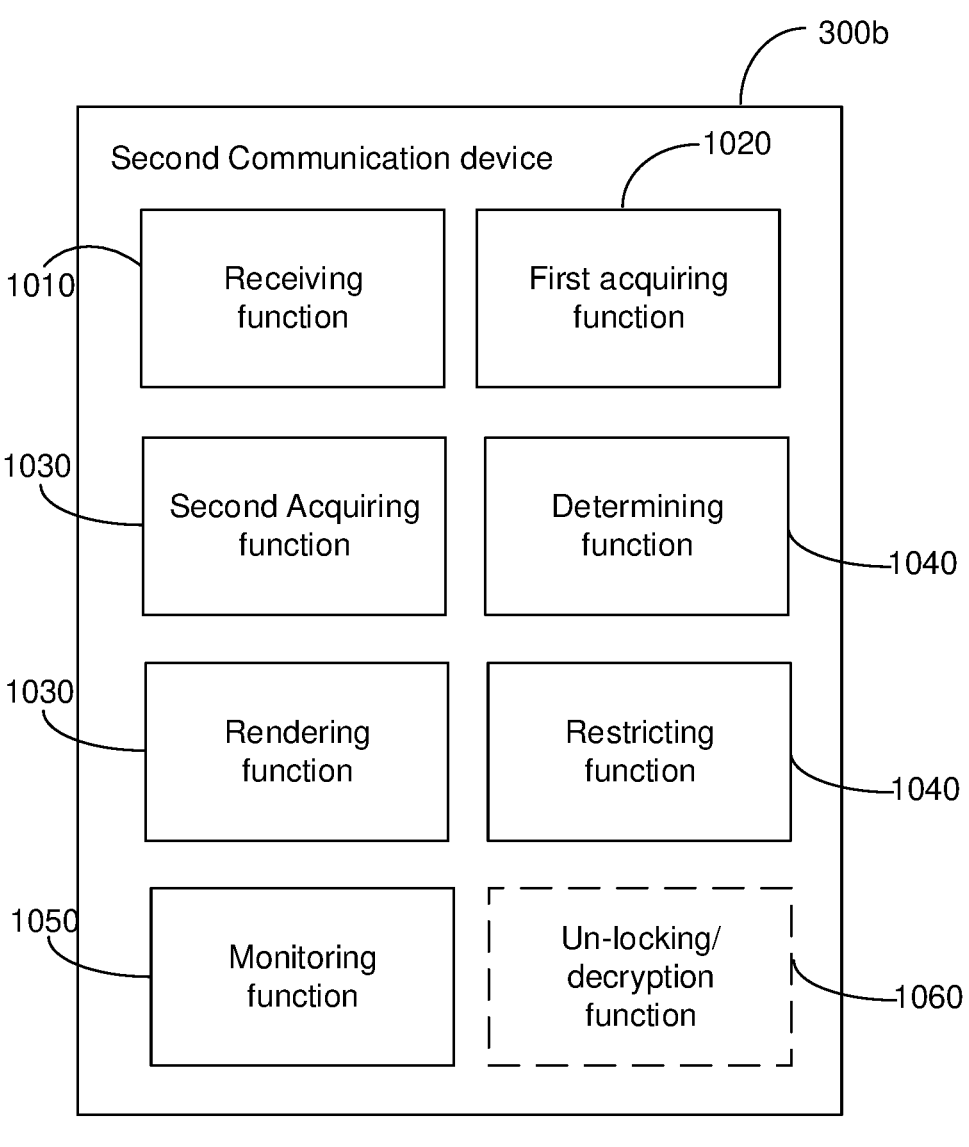
FIG. 10 is a block scheme of a second communication device, capable of receiving content from a first communication device, where the second communication device is arranged according to a second aspect.

A second communication device 300a, capable of accessing content, provided by a first communication device 200, will now be described in further detail, with reference to FIG. 9, where the second communication device comprises processing circuitry 910 and a memory 920, comprising executable instructions, which when executed by the processing circuitry 910, is configured to cause the second communication device 300a to: receive the content, wherein access to the content is conditional, based on sensor data of at least one of the first 200 and the second communication device 300a; to acquire sensor data of at least one of the first 200 and the second communication device 300a; to acquire full access to the content in case it is determined, at the second communication device 300a, that the sensor data of at least one of the first 200 and the second communication device 300a indicates that the second communication device 300a shall have full access to the content, or to acquire restricted access to the content, in response to recognizing that sensor data of at least one of the first 200 and the second communication device 300a indicates that the second communication device 300a shall have restricted access to the content. The second communication device 300a is capable of communicating with the first communication device 200 and, if applicable, also a server 400, via a communication interface 940, according to an applicable communication protocol. Sensor data acquired by the second communication device 300a, may be acquired from one or more sensors comprised on the second communication device 300a, here represented by sensor 960, connected to the second communication device 300a (not shown), or provided as a combination of both.

The memory 920 can be any combination of random access memory (RAM) and/or read only memory (ROM). The memory 920 also typically comprises persistent storage, which, for example, can be any single one or combination of magnetic memory, optical memory, solid-state memory or even remotely mounted memory. The processing circuitry 910 may comprise e.g. one or more central processing unit (CPU), multiprocessor or digital signal processor (DSP). The second communication device 300a also comprise transmitting and receiving functionality, here represented by communication interface 940, for enabling communication with the first communication device 200 and a server 400.

The computer readable instructions, configured to provide the functionality as described herein may be provided as a computer program 930, in the form of a computer program product 950, where the computer program product may be e.g. an optical disc, such as a Compact Disc (CD), a Digital Versatile Disc (DVD) or a Blu-Ray disc.

In resemblance to the first communication device 200, also the second communication device 300a may, according to one embodiment, be configured to initiate monitoring of at least part of the sensor data at the second communication device 300a.

According to one embodiment, the second communication device 300a access configured to receive the content in response to the second communication device 300a having accepted an offer to conditional access to the content received from the first communication device 200, whereas according to a second embodiment, the second communication device 300a is instead configured to receive the content in response to the first communication device 200 having accepted a request for the content, provided from the second communication device 300a.

The second communication device 300a may be configured to receive at least one of code and a parameter, decisive of at least one condition for when access to the content is to be restricted at the second communication device 300a, from the first communication device 200, in case not all such data is already available at the second communication device 300a.

The second communication device 300a may be configured to receive data from the first communication device 200, indicating at least one condition for decrypting the content.

The second communication device 300a is configured to acquire sensor data, where the sensor data may comprise at least one of: orientation sensor data, touch sensor data, touch pattern data, symbol data, face identity data, and tap strength sensor data.

The second communication device 300a is configured to recognize the sensor data of at least one of the first 200 and the second communication device 300a as indicating that access to the content is to be restricted at the second communication device 300a, when the acquired sensor data is identified by the second communication device 300a to conform to at least one predetermined characteristics, wherein the predetermined characteristics comprise at least one of the following: a touch pattern, a symbol, a predetermined face identity, a tap strength, an orientation of the device, an eye gaze and/or pose of a user of at least one or the communication devices 200, 300a and fulfillment of at least one predetermined condition, when compared to at least one threshold value.

Figure 3A:
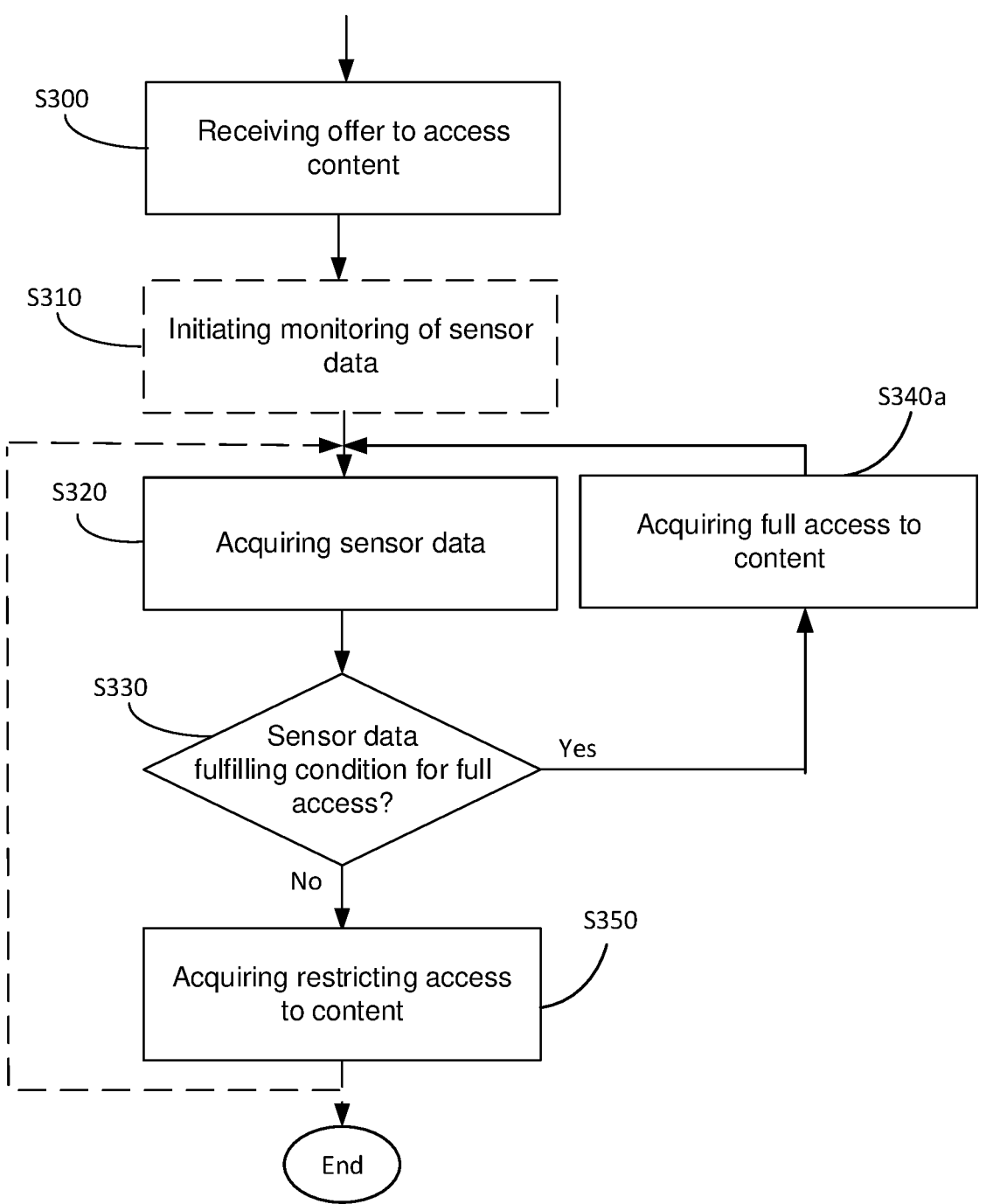
FIG. 3*a* is a flow chart of a method, executable in a communication device which is capable of accessing content offered by another communication device, according to one embodiment.
Figure 3B:
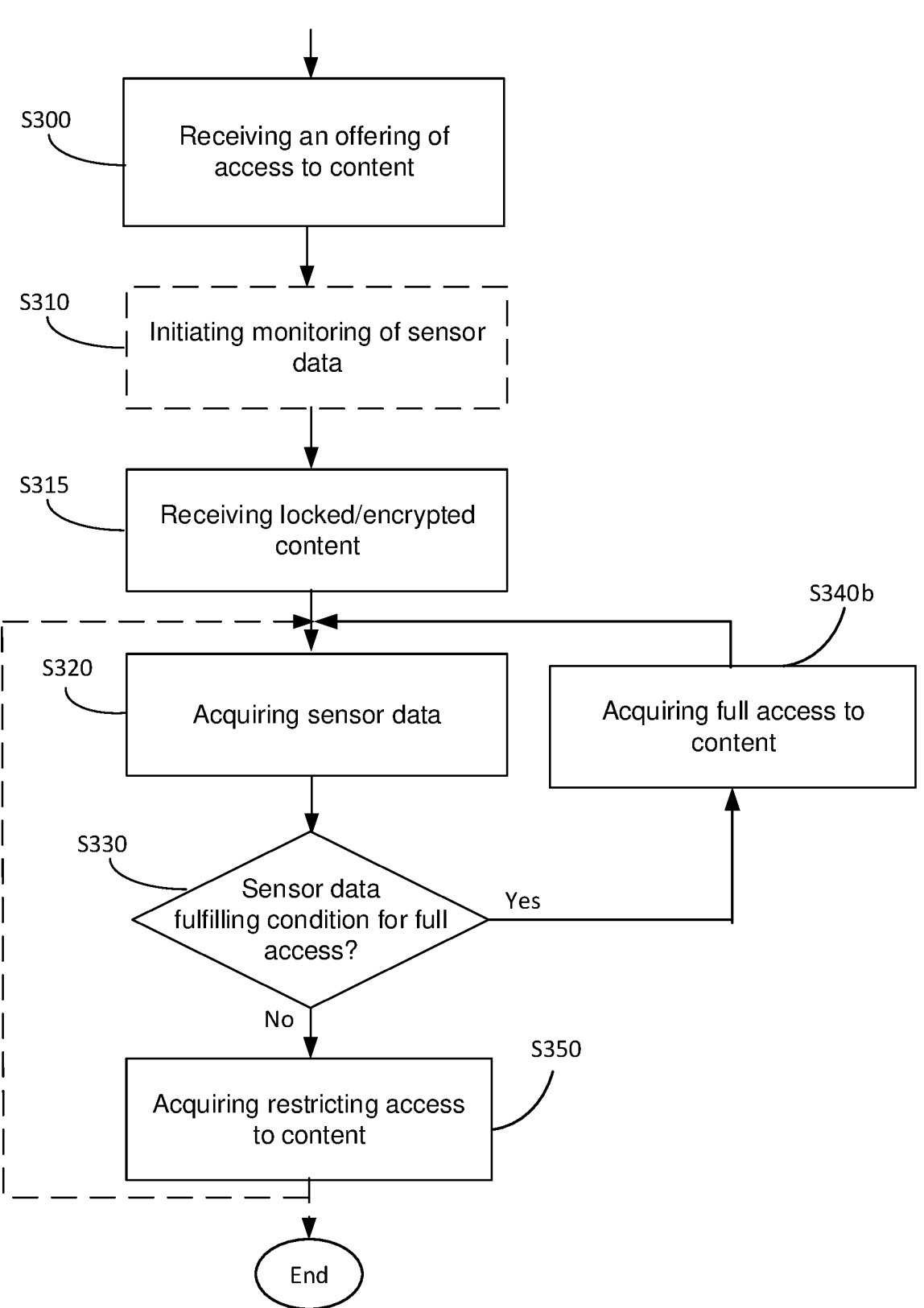
FIG. 3*b* is a flow chart of a method, executable in a communication device which is capable of accessing content offered from another communication device, according to another embodiment.

According to another aspect, a second communication device 300b, will now be the content, corresponding to step S300 of FIG. 3a or 3b, wherein access to the content is conditional, based on sensor data of at least one of the first and the second communication device; a first acquiring function 1020, configured to acquire sensor data of at least one of the first 200 and the second communication device 300, corresponding to step S320 of FIG. 3a or 3b. The second communication device 300a also comprises a second acquiring function 1030, configured to acquire full access to the content, corresponding to step S340 of FIG. 3a or 3b, in case it is determined, by a determining function 1040 that the sensor data of at least one of the first 200 and the second communication device 300a indicates that the second communication device 300a shall have full access to the content, corresponding to step S330 of FIG. 3a or 3b or, acquiring, by the second acquiring function 1030, restricted access to the content, corresponding to step S350 of FIG. 3a or 3b, in response to determining that sensor data of at least one of the first and the second communication device indicates that access to the content is to be restricted at the second communication device 300b, corresponding to step S330 of FIG. 3a or 3b.

Figure 11:
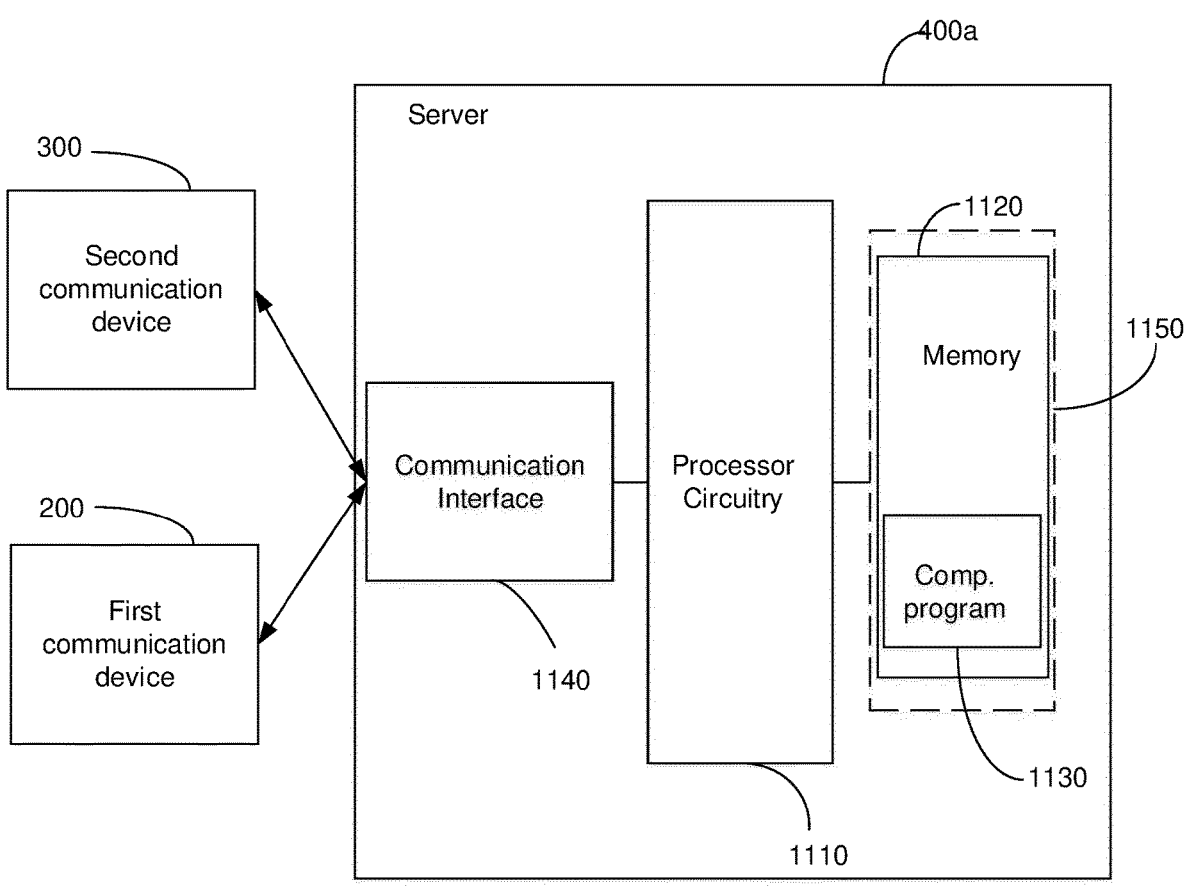
FIG. 11 is a block scheme of a server, capable of assisting a first communication device to offer content to a second communication device, where the server is arranged according to a first aspect.

A server for providing a second communication device 300 access to content, provided by a first communication device 200 according to a first embodiment will now be described in further detail with reference to FIG. 11, where the server 400a comprise processing circuitry 1110 and a memory 1120, comprising executable instructions, which when executed by the processing circuitry 1110, causes the second communication device 300 to provide an offer to the second communication device 300, offering the second communication device 300 access to the content, wherein access to the content at the second communication device 300 is conditional based on sensor data of at least one of the first 200 and the second communication device 300. The server is also caused to provide the second communication device 300 full access to the content, in case it is determined that the sensor data of at least one of the first 200 and the second communication device 300 indicates that the second communication device 300 shall have full access to the content, or to provide the second communication device 300 restricted access to the content, in response to recognizing an indication to restrict access to the content at the second communication device 300, based on the sensor data of at least one of the first 200 and the second communication device 300.

The memory 1120 can be any combination of random access memory (RAM) and/or read only memory (ROM). The memory 1120 also typically comprises persistent storage, which, for example, can be any single one or combination of magnetic memory, optical memory, solid-state memory or even remotely mounted memory. The processing circuitry 1110 may comprise e.g. one or more central processing unit (CPU), multiprocessor or digital signal processor (DSP). The server 400a also comprise transmitting and receiving functionality, here represented by communication interface 1140, for enabling communication with the first communication device 200 and the second communication device 300.

The computer readable instructions, configured to provide the functionality as described herein may be provided as a computer program 1130, in the form of a computer program product 1150, where the computer program product may be e.g. an optical disc, such as a Compact Disc (CD), a Digital Versatile Disc (DVD) or a Blu-Ray disc.

The server may be configured to initiate monitoring of sensor data at, at least one of the first 200 and the second communication device 300.

According to alternative embodiments, the server 400a is configured to receive at an indication of an UIM, of an encryption method, or a combination of both, to be applied by the server 400a, the second communication device 300, or both devices.

In case UIM is to be applied and, thus, conditions for sharing content comprise a UIM, the server 400a may be configured to initially provide the content to the second communication device as locked content. In the latter scenario, the server 400a may further be configured to receive an indication of a UI to be applied by the server 400a, the second communication device 300, or both entities, and to unlock the content at the server 400a, the second communication device 300, or both entities, in response to recognizing sensor data of at least one of the first 200 and the second communication device 300, indicating that content accessible to the second communication device 300 is to be un-locked.

According to one embodiment, the server is configured to receive at least one of code and a parameter, decisive of under which conditions access to the content is to be restricted at the second communication device 300.

According to one embodiment, the server is configured to receive information on encryption method to be applied on the content by the server 400a, the second communication device 300, or by both entities.

In case encrypted content is to be handled, the server 400a may be configured to recognize data provided by the first communication device 200, thereby enabling decryption of the content, in case recognized data of the first communication device 200, the second communication device 300, or both devices, indicates that the data correspond to conditions for decrypting the content, where the recognized data may comprise credentials, sensor data or a combination of both.

The server 400a may be configured to acquire various types of sensor data, comprising e.g. one or more of orientation sensor data, touch sensor data, touch pattern data, symbol data, face identity data, and tap strength sensor data.

In order to handle and process acquired sensor data, the server 400a may be configured to recognize the sensor data of at least one of the first 200 and the second communication device 300, as indicating that access to the content is to be restricted at the second communication device 300, when the acquired sensor data is identified by the server 400a to conform to at least one of the following predetermined characteristics: a touch pattern, a symbol, a face identity, a tap strength, an orientation of the device, a eye gaze and/or pose of a user of at least one or the communication devices 200, 300, and fulfillment of at least one predetermined condition, when compared to at least one threshold value.

Figure 12:
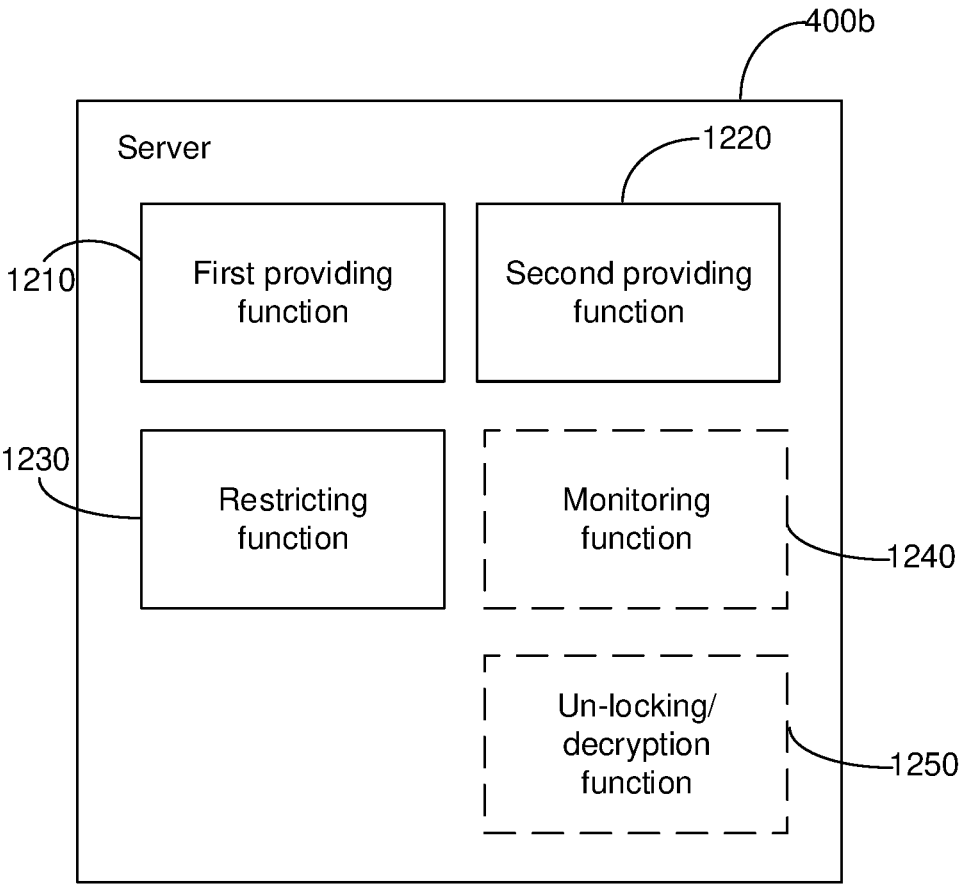
FIG. 12 is a block scheme of a server, capable of assisting a first communication device to offer content to a second communication device, where the server is arranged according to a second aspect.

A serve according to another aspect will now be described in further detail with reference to FIG. 12, where the server 400b comprise a first providing function 1210, configured to provide an offer to a second communication device 200, offering access to content, corresponding to step S400 of FIG. 4, wherein access to the content at the second communication device 200 is conditional based on sensor data of at least one of the first 200 and the second communication device 300. The sever 400b also comprise a second providing function 1220 configured to provide the second communication device 200 full access to the content, corresponding to step S440 of FIG. 4, in case it is determined that the sensor data of first communication device 200, the second communication device 300, or both, indicates that the second communication device 200 shall have full access to the content, corresponding to step, corresponding to step S430 of FIG. 4 or the second providing function 1220 is configured to provide the second communication device 200 restricted access to the content, corresponding to step S450 of FIG. 4, in response to recognizing, by a restricting function 1230 an indication to restrict access to the content at the second communication device 300, based on the sensor data of at least one of the first 200 and the second communication device 300, corresponding to step S430 of FIG. 4. The server 400b may also comprise a monitoring function 1240 for monitoring sensor data, and an un-locking and/or decryption function 1250 for un-locking and/or decrypting locked and/or encrypted content.

The invention claimed is:

1. A method at a first communication device for providing a second communication device access to content, the method comprising:

the first communication device providing to the second communication device an offer offering the second communication device conditional access to the content, wherein access to the content at the second communication device is adaptable based on sensor data of the first communication device;

the first communication device acquiring sensor data of the first communication device; and i) the first communication device providing the second communication device full access to the content in case it is determined that the sensor data of the first communication device indicates that the second communication device shall be granted full access to the content, or ii) the first communication device determining that access to the content is to be restricted at the second communication device, and providing the second communication device restricted access to the content, in case it is determined that sensor data of the first communication device is indicating that access to the content is to be restricted at the second communication device, wherein the first communication device comprises a touch screen and/or a camera, and

the acquired sensor data of the first communication device comprises touch data produced by the touch screen of the first communication device and/or image data produced by the camera of the first communication device.

2. The method of claim 1, wherein the method further comprises determining whether the sensor data of the first communication device indicates that the second communication device shall be granted full access to the content, and the determination comprises determining, based on the touch data, that a user of the first communication device has touched the touch screen according to a predetermined pattern.

3. A method at a second communication device for accessing content provided by a first communication device, the method comprising:

receiving the content, wherein access to the content is conditional, based on sensor data of the first communication device;

acquiring sensor data of the first communication device; and i) acquiring full access to the content in case it is determined, at the second communication device, that the sensor data of the first and/or the second communication device indicates that the second communication device shall have full access to the content, or ii) acquiring restricted access to the content, in response to recognizing that sensor data of the first communication device indicates that access to the content is to be restricted at the second communication device, wherein the first communication device comprises a touch screen and/or a camera, and the acquired sensor data of the first communication device comprises touch data produced by the touch screen of the first communication device and/or image data produced by the camera of the first communication device.

4. A first communication device for providing a second communication device access to content, the first communication device comprising processing circuitry and a memory comprising executable instructions which when executed by the processing circuitry causes the first communication device to:

provide to the second communication device an offer offering the second communication device conditional access to the content, wherein access to the content is conditional based on sensor data of the first communication device; and acquire sensor data of the first communication device;

i) provide the second communication device full access to the content in case it is determined that the sensor data of the first communication device indicates that the second communication device shall be granted full access to the content, or ii) determine that access to the content is to be restricted at the second communication device, and provide the second communication device restricted access to the content, in case it is determined that sensor data of the first communication device is indicating that access to the content is to be restricted at the second communication device, wherein the first communication device comprises a touch screen and/or a camera, and the acquired sensor data of the first communication device comprises touch data produced by the touch screen of the first communication device and/or image data produced by the camera of the first communication device.

5. The first communication device of claim 4, configured to monitor at least part of the sensor data at, at least one of, the first and the second communication device.

6. The first communication device of claim 4, configured to provide the offer to the second communication device in an invitation to the second communication device.

7. The first communication device of claim 4, configured to provide the offer to the second communication device in a response to having received a request for said content, from the second communication device.

8. The first communication device of claim 4, further configured to provide, to a receiving entity at least one of an indication of an Unlock-Interaction Method (UIM) and an encryption method to be applied by the second communication device.

9. The first communication device of claim 8, wherein if a UIM is provided, the first communication device is configured to initially provide the content to the receiving entity as locked content.

10. The first communication device of claim 9, further configured to:

initiate an Unlocking-Interaction (UI) with the receiving entity, and unlock the content at the receiving entity, in response to recognizing sensor data of at least one of the first and the second communication device, indicating that the content is to be un-locked.

11. The first communication device of claim 4, further configured to provide, to the second communication device, at least one of code and a parameter, decisive of at least one condition for when access to the content is to be restricted at the second communication device.

12. The first communication device of claim 11, further configured to provide data to the second communication device, indicating at least one condition for decrypting the content.

13. The first communication device of claim 4, configured to acquire sensor data comprising:

orientation sensor data, touch pattern data symbol data face identity data, and/or tap strength sensor data.

14. The first communication device of claim 4, configured to recognize the sensor data of at least one of the first and the second communication device as indicating that access to the content is to be restricted at the second communication device, when the acquired sensor data is identified by the first communication device to conform to at least one of the following:

a predetermined touch pattern, a predetermined symbol, a predetermined face identity, a predetermined tap strength, a predetermined orientation of the device, a predetermined eye gaze and/or pose of a user of at least one or the communication devices, or fulfillment of at least one predetermined condition, when compared to at least one threshold value.

15. A second communication device for accessing content provided by a first communication device, the second communication device comprising processing circuitry and a memory comprising executable instructions that when executed by the processing circuitry causes the second communication device to:

receive the content, wherein access to the content is conditional based on sensor data of the first communication device;

acquire sensor data of the first communication device; and i) acquire full access to the content in case it is determined, at the second communication device, that the sensor data of the first communication device indicates that the second communication device shall have full access to the content, or ii) acquire restricted access to the content in response to recognizing that sensor data of the first communication device indicates that the second communication device shall have restricted access to the content, wherein the first communication device comprises a touch screen and/or a camera, and the acquired sensor data of the first communication device comprises touch data produced by the touch screen of the first communication device and/or image data produced by the camera of the first communication device.

16. The second communication device of claim 15, configured to initiate monitoring of at least part of the sensor data at the second communication device.

17. The second communication device of claim 15, configured to receive the content in response to the second communication device having accepted an offer to conditional access to the content received from the first communication device.

18. The second communication device of claim 15, configured to receive the content in response to the first communication device having accepted a request for the content, provided from the second communication device.

19. The second communication device of claim 15, further configured to receive from the first communication device at least one of code and a parameter, decisive of at least one condition for when access to the content is to be restricted at the second communication device.

20. The second communication device of claim 19, further configured to receive data from the first communication device, indicating at least one condition for decrypting the content.

21. The second communication device of claim 15, configured to acquire sensor data comprising:

orientation sensor data, touch sensor data, touch pattern data, symbol data face identity data, and/or tap strength sensor data.

* * * * *